US005970733A

United States Patent [19]

Hamaoka et al.

[11] Patent Number: 5,970,733

[45] Date of Patent: Oct. 26, 1999

[54] REFRIGERATING APPARATUS AND REFRIGERATOR CONTROL AND BRUSHLESS MOTOR STARTER USED IN SAME

[75] Inventors: Kouji Hamaoka, Osaka; Keiji Ogawa, Yamatokoriyama; Koyo Shibuya, Nara; Takashi Satomura, Kobe; Hideharu Ogahara, Osaka; Yasuhiro Tsujii, Osaka; Kazunori Kurimoto, Osaka, all of Japan

[73] Assignee: Matsushita Refrigeration Company, Osaka, Japan

[21] Appl. No.: 09/175,569

[22] Filed: Oct. 20, 1998

Related U.S. Application Data

[62] Division of application No. 08/737,234, filed as application No. PCT/JP96/00641, Mar. 14, 1996, Pat. No. 5,857,349.

[30] Foreign Application Priority Data

| | | | |
|---|---|---|---|
| Mar. 14, 1995 | [JP] | Japan | 7-54326 |
| Mar. 14, 1995 | [JP] | Japan | 7-54327 |
| Jun. 27, 1995 | [JP] | Japan | 7-160399 |

[51] Int. Cl.[6] ..... F25B 1/00

[52] U.S. Cl. ..... 62/228.4; 62/126; 62/158

[58] Field of Search ..... 62/229, 228.3, 62/228.4, 228.5, 157, 158, 234, 231, 126, 129, 230; 318/778, 779, 783, 782; 417/22, 32, 42; 388/934

[56] References Cited

U.S. PATENT DOCUMENTS

| | | | |
|---|---|---|---|
| 3,696,278 | 10/1972 | Kuniyoshi et al. | 318/138 |
| 4,653,285 | 3/1987 | Pohl | 62/126 |
| 4,724,680 | 2/1988 | Kawai | 318/779 X |
| 4,765,150 | 8/1988 | Persem | 62/215 |
| 4,876,491 | 10/1989 | Squires et al. | 318/138 |
| 4,888,533 | 12/1989 | Gotoh et al. | 318/524 |
| 4,891,953 | 1/1990 | Isono | 62/209 |
| 4,939,909 | 7/1990 | Tsuchiyama et al. | 62/158 |
| 4,939,910 | 7/1990 | Umezu et al. | 62/228.4 X |
| 4,959,969 | 10/1990 | Okamoto et al. | 62/228.4 X |
| 4,968,338 | 11/1990 | Sgiyama | 62/126 |
| 5,123,080 | 6/1992 | Gillett et al. | 388/934 X |
| 5,125,067 | 6/1992 | Erdman | 388/934 |
| 5,225,759 | 7/1993 | Endo et al. | 318/778 |
| 5,253,481 | 10/1993 | Takagi et al. | 62/228.4 X |
| 5,323,619 | 6/1994 | Kim | 62/228.4 X |
| 5,345,156 | 9/1994 | Moreira | 318/254 |
| 5,378,976 | 1/1995 | Inaji et al. | 318/810 |
| 5,436,547 | 7/1995 | Nagai et al. | 62/228.4 X |

FOREIGN PATENT DOCUMENTS

| | | |
|---|---|---|
| 553 354 | 8/1993 | European Pat. Off. . |
| 621 681 | 10/1994 | European Pat. Off. . |
| 63-194587 | 11/1988 | Japan . |

*Primary Examiner*—Harry B. Tanner
*Attorney, Agent, or Firm*—Wenderoth, Lind & Ponack, L.L.P.

[57] ABSTRACT

When a lock detector detects a locked state of a DC motor in a starting stage, a torque increasing circuit immediately selects a starting sequence pattern of an output torque that is greater in magnitude by one preselected step, and outputs the selected output torque to a starting sequence controller, so that a compressor can be restarted speedily without repeating starting failures. A compressor, driven by a DC motor, has a shell of an internal pressure approximately equal to the pressure of an inhalation gas. An inverter is provided to make the speed of the DC motor variable. A rotational frequency setting circuit sets the rotational frequency of the DC motor to a frequency that is not greater than the frequency of a commercial power source when the internal temperature of a refrigerator is stabilized. By this construction, the power consumption can be remarkably reduced.

4 Claims, 18 Drawing Sheets

First compulsory output
Low-frequency/Synchronous starting
Reverse induction voltage detection

REFRIGERATING APPARATUS AND REFRIGERATOR CONTROL AND BRUSHLESS MOTOR STARTER USED IN SAME

This is a Divisional application of Ser. No. 08/737,234 filed on Nov. 13, 1996. U.S. Pat. No. 5,857,349, which is a national stage of PCT/JP961/00641 filed Mar. 14, 1996.

TECHNICAL FIELD

The present invention relates to a refrigerating apparatus executing a refrigeration cycle and having a compressor motor control device. The present invention also relates to a refrigerator control device used in the refrigerating apparatus for controlling a rotational frequency or speed of a refrigerator compressor. The present invention also relates to a brushless motor starter in which the position of rotor magnetic polls of a DC brushless motor having an inverter-controlled rotational frequency is detected in a sensor-less system.

BACKGROUND ART

There have been proposed a large number of refrigerators aimed at saving energy and improving the refrigerator's ability to refrigerate quickly by making the rotational frequency or speed of the compressor variable. For example, as disclosed in Japanese Laid-Open Patent Publication (unexamined) No. 2-140577, there is a trial of producing an effect by making the rotational frequency of a compressor of a refrigerator variable by means of an inverter.

A rotary compressor, as disclosed in the aforementioned prior art document, has generally been used as a compressor whose rotational frequency is made variable by an inverter. The rotary compressor has been so used because its refrigerating ability varies approximately linearly according to the chance of the rotational frequency and because it has had an excellent capability in that its lubricating ability depends less on the rotational frequency.

However, according to the conventional construction, there has been the following problems in using the rotary compressor.

In general, the rotary compressor has a high pressure inside its shell. That is, an inhalation gas having a low pressure is directly inhaled into a cylinder of its compressing section. The gas is then discharged once into the shell after compression. Thereafter, the gas is transferred into a cooling system through a discharge pipe. Thus, since the shell has a high internal pressure, it has been widely known that the gas having a high pressure and a high temperature leaks causing the gas to intrude into a cylinder inside the compression section. This leakage and intrusion is a factor in the reduction of the compression efficiency of the compressor (leakage heat loss).

However, the leakage heat loss has no relation to the rotational frequency, and depends on the magnitude of the high pressure and the magnitude of the low pressure. That is, there has been such a phenomenon that, when the rotational frequency has been lowered to reduce the refrigerating ability of the compressor itself, the rate of the leakage heat loss has increased, consequently reducing the efficiency of the compressor.

When the internal temperature of the refrigerator is stabilized, the need for great refrigerating ability is not present. In such a case, where energy saving is attempted by lowering the rotational frequency by an inverter to reduce the refrigerating ability, there has been a problem in that the energy saving effect cannot be obtained due to the reduction of the efficiency of the compressor.

Furthermore, in the case of a reciprocating compressor, the oil supplying ability depends on the rotational frequency. This dependence has caused a problem in that the reliability is degraded particularly at a low rotational frequency. Also, because the reciprocating compressor requires a large starting torque, smooth starting has not been able to be achieved.

Also, there has been proposed a method of starting a compressor motor control device wherein the position of rotor magnetic poles of a DC brushless motor, whose rotational frequency is controlled by an inverter, is detected by utilizing an induction voltage at the stator winding in a sensor-less system. This method, however, cannot effect the position detection when the motor is stopped, because no induction voltage is generated in such a state. Therefore, it has been a general practice to execute the starting according to a predetermined starting sequence pattern up to a specified rotational frequency at which the position detection is enabled, and thereafter to switch the pattern to the sensor-less system. Such a prior art starting method for the compressor motor control device is disclosed, for example, in Japanese Laid-Open Patent Publication (unexamined) No. 1-54960.

Because a transient DC component in a filter circuit employed in a sensor-less circuit is not sufficiently attenuated at the starting of the DC motor, the above method has been devised to prevent the possible failure of the switching as a consequence of an unstable switching to the sensor-less system. According to this method, the switching to the sensor-less system is effected after the transient DC component is sufficiently attenuated in order to reduce starting failures of the compressor motor control device.

This method, however, uses only one starting sequence pattern, which has caused a problem in that, when a load torque of the DC motor is great at the time of starting, the compressor is occasionally brought into a locked state during the starting sequence pattern operation before the switching to the sensor-less system is effected.

On the other hand, brushless motors have been widely used since they have high efficiencies and permit a rotational frequency control under voltage control. Particularly, since the method of detecting the rotational position from a reverse induction voltage generated at the winding voltage of the motor was proposed lately as a technique for obviating the need of a position detection element for detecting the rotational position of the brushless motor, brushless motors have been extensively used even in very bad operational environments such as with compressors and the like where the temperature is high and refrigerant and oil exist inside.

Generally, in order to eliminate the influence of a voltage waveform due to PWM (Pulse Width Modulation) in detecting the reverse induction voltage, filter circuits are often used. Such use of filter circuits however, has caused a problem in that the position detection becomes unstable in a transient state such as the motor starting stage. A method for eliminating the above disadvantage has been also proposed, for example, in Japanese Patent Laid-Open Publication (unexamined) No. 58-190287. The prior art brushless motor starting method will be described below with reference to FIG. 19.

FIG. 19 is an explanatory view of a prior art brushless motor starting method.

Referring to FIG. 19, when a stopped motor is started, the motor is operated as a synchronous motor because no reverse induction voltage is generated (low-frequency synchronous starting). In this stage, a drive frequency is accelerated so that the rotational frequency gradually increases. With this operation, the rotational frequency also increases.

When the rotational frequency of the motor reaches a specified rotational frequency, it is allowed to execute position detection from the reverse induction voltage, and the motor comes to operate as a brushless motor by switching. Thereafter, acceleration, deceleration and maintaining of the rotational frequency can be achieved by controlling the voltage.

By providing time intervals (t4 and t5) in which no acceleration is effected for a specified time in the switching stage and effecting the switching after waiting for a sufficient attenuation of the transient DC component in the filter circuit, or by starting acceleration after the transient phenomenon in the switching operation is completed, a stability in the switching stage has been assured.

However, the prior art construction has had the following problems.

In the brushless motor in which the position detection is executed based on the reverse induction voltage, the motor starts its operation as a synchronous motor according to the low-frequency synchronous starting in the motor starting stage. In this stage, a voltage and a frequency are applied to the motor so that a specified torque is generated. In this stage, since noise and vibration are caused when the torque is made excessively high and step-out may be incurred when the torque is insufficient, there is a scheme of applying the voltage and frequency in the most appropriate state as far as possible.

Furthermore, in the position detection operation based on the reverse induction voltage, the filter circuit is originally designed so as to become optimum in a region where the motor operates normally, and therefore, the motor tends to step out when a high torque is applied at a low speed.

Accordingly, the prior art method has been effective for a motor that has a small load in the starting stage or at a low rotational frequency (e.g., fan motor).

However, in compressors for use in refrigerators and air conditioners or the like, there may be a case where a high load is applied several seconds after the starting stage. Generally, in a compressor, a difference in pressure of compression gas takes place and the load torque increases immediately after the starting. Particularly, it is well known that a great amount of torque is applied several seconds after the starting stage.

When the conventional method is used in such a case, since the acceleration stop interval is provided when a high load torque is applied, there has been such a problem that a step-out is caused by the high load torque in either the low-frequency synchronous starting operation or the operation based on the reverse induction voltage detection.

Particularly, at the time of turning on the power, capacitors of the filter circuit are totally completely discharged and, therefore, a considerable duration of the acceleration stop interval has been required until the motor is put into its stable state. Accordingly there has been a problem in that the motor tends to step out in the acceleration stop interval.

The present invention has been devised in view of the aforementioned problems inherent in the prior art techniques. It is, accordingly, an object of the present invention to provide a refrigerating apparatus which fails little at the time of starting. When a locked state of the compressor is detected during a starting sequence pattern operation in the refrigerating apparatus of the present invention, the compressor is restarted according to a starting sequence pattern of an output torque that is greater by one step.

Another object of the present invention is to provide a refrigerating apparatus which fails less at the time of starting by detecting a load torque of a DC motor based on the ambient temperature of a refrigerating system, a cooler temperature or an inhalation pressure, and by starting the motor according to a starting sequence pattern corresponding to the load torque from the beginning of operation.

A further object of the present invention is to provide a refrigerator control device capable of preventing the possible reduction in efficiency of the compressor due to the leakage heat loss, assuring a high efficiency even at a low rotational frequency, and remarkably reducing the amount of power consumption.

A still further object of the present invention is to provide a refrigerator control device capable of stably starting the compressor by generating a specified torque and executing a stable operation without incurring step-out just after the starting.

Another object of the present invention is to provide a refrigerator control device having an improved reliability by speedily executing oil supply at the time of starting and assuring a sufficient amount of lubricating oil when oil shortage occurs due to the occurrence of an unforeseen accident such as mixture of gas in the stage of slow rotation.

A further object of the present invention is to provide a brushless motor starter capable of operating the motor without step-out even when a high load torque is required after the starting by sufficiently reducing the transient DC component without providing any acceleration stop interval.

A still further object of the present invention is to provide a brushless motor starter capable of stably starting the motor by speedily completing a position detection process even at the time of closing the power during which the position detection is likely to be unstable, or by compulsorily terminating the process even when the process is not completed by decision.

SUMMARY OF THE INVENTION

In order to accomplish the aforementioned objects, a refrigerating apparatus according to the present invention includes an inverter circuit, a DC motor, a condenser, and a cooler. The inverter circuit has a plurality of semiconductor switches and a plurality of diodes connected with each other in the form of a bridge. The DC motor has a rotor and is operated by the inverter circuit. The compressor is driven by the DC motor. The condenser is connected with the compressor to constitute a refrigerating cycle. The cooler is connected with the compressor. The refrigerating apparatus further includes a position detecting means for detecting a position of the rotor of the DC motor, a commutating means for outputting a commutation pulse to decide an operation of the semiconductor switches of the inverter circuit based on an output of the position detecting means, a rotational frequency detecting means for detecting a rotational frequency of the compressor based on the output of the position detecting means, and a lock detecting means for detecting a locked state of the compressor based on an output of the rotational frequency detecting means. The refrigerating apparatus also includes a chopping signal generating means for generating a chopping signal to effect chopping so as to make variable the rotational frequency of the DC motor, a combining means for combining the commutation pulse with the chopping signal, and a drive means for turning on and off the semiconductor switches of the inverter circuit based on an output of the combining means.

A starting sequence control means is provided for outputting a predetermined commutation pulse and a predetermined chopping signal to the combining means when no output is obtained from the position detecting means in a starting stage of said DC motor. The starting sequence control means executes restarting by output again the commutation pulse and the chopping signal after a specified time interval when the lock detecting means detects locking of the compressor.

Furthermore, a plurality of starting sequence pattern storing means stores respective starting sequence patterns of the commutation pulse and the chopping signal outputted from the starting sequence control means. The starting sequence patterns have different output torques.

In the starting stage, a torque increasing means selects a starting sequence pattern of a minimum output torque from among the starting sequence patterns. In a restarting stage, the torque increasing means selects another starting sequence pattern of an output torque greater by one step than the starting sequence pattern of the minimum output torque, and outputs the resulting sequence pattern to the starting sequence control means.

In the starting stage, the starting sequence control means is connected to the combining means by an operating mode switching means, which also connects the commutating means and the chopping signal generating means to the combining means after the starting.

Advantageously, an ambient temperature detecting means is provided for detecting an ambient temperature of the refrigerating cycle. In this case, the torque increasing means compares the ambient temperature detected by the ambient temperature detecting means with a preset reference ambient temperature, and selects a starting sequence pattern of a great output torque corresponding to the ambient temperature when the ambient temperature is higher in the starting stage. In the restarting stage, the torque increasing means selects another starting sequence pattern of an output torque greater by one step, and outputs the resulting sequence pattern to the starting sequence control means.

Alternatively, a cooler temperature detecting means may be provided for detecting a cooler temperature. In this case, the torque increasing means compares the cooler temperature detected by the cooler temperature detecting means with a preset reference cooler temperature, and selects a starting sequence pattern of a great output torque corresponding to the cooler temperature when the cooler temperature is higher in the starting stage. In the restarting stage, the torque increasing means selects another starting sequence pattern of an output torque greater by one step, and outputs the resulting sequence pattern to the starting sequence control means.

Again alternatively, an inlet pressure detecting means may be provided for detecting an inlet pressure of the compressor. In this case, the torque increasing means compares the inlet pressure detected by the inlet pressure detecting means with a preset reference pressure, and selects a starting sequence pattern of a great output torque corresponding to the inlet pressure when the inlet pressure is higher in the starting stage. In the restarting stage, the torque increasing means selects another starting sequence pattern of an output torque greater by one step, and outputs the resulting sequence pattern to the starting sequence control means.

In another form of the present invention, a refrigerating apparatus includes a compressor having a shell of an internal pressure approximately equal to a pressure of an inhalation gas, a motor for operating the compressor, and an inverter for controlling the motor to rotate by a specified amount of rotation for a specified time interval after starting and then for controlling the motor according to an internal temperature of the refrigerator.

On the other hand, a control device of the present invention is intended for use with a refrigerator which includes a compressor having a shell of an internal pressure approximately equal to the pressure of an inhalation gas, a compressing section accommodated in the shell, and a DC motor having a rotor and a stator for operating the compressing section. The control device includes a reverse induction voltage detector circuit for detecting a rotational position of the rotor from a reverse induction voltage generated at a stator winding, an inverter for executing a commutating operation based on an output of the reverse induction voltage detector circuit during a normal operation so as to operate the DC motor at a variable speed, and a rotational frequency setting circuit for setting a rotational frequency of the DC motor to be lower than a commercial power frequency when the internal temperature of the refrigerator is stabilized.

The control device may further include a rotor fixing circuit for turning on a specified phase of the inverter and outputting a specified voltage when an output of the rotational frequency setting circuit is shifted from a stop state to an operating state, and a first timer circuit for maintaining an output of the rotor fixing circuit for a specified time interval.

Alternatively, the control device may further include a starting commutation pattern storing circuit for preparatorily storing a specified commutation pattern to accelerate the DC motor within a short time, a starting voltage pattern storing circuit for preparatorily storing a specified voltage pattern to allow the DC motor to yield a specified torque, a commutation selector circuit for selecting an output from the starting commutation pattern storing circuit in the starting stage of the DC motor so as to operate the inverter in a commutating manner, a voltage selector circuit for varying an output voltage of the inverter in synchronization with the commutation pattern according to the output of the starting voltage pattern storing circuit, and a commutation selector circuit for switching to a commutating operation based on a normal output of the reverse induction voltage detector circuit when the output of the starting commutation pattern storing circuit is completed.

Again alternatively, the control device may further include an increase rate selector circuit for selecting a rate of acceleration by increasing the output voltage of the inverter after the DC motor is started, and a second timer circuit operating for a specified time interval after the starting operation is completed. In this case, a first increase rate is selected when the second timer circuit is operating while a second increase rate greater than the first increase rate is selected after the operation of the second timer circuit is completed.

Alternatively, the control device may further include a third timer circuit operating for a specified time interval in a rise time of the DC motor, and a rotational frequency selector circuit for selecting a rotational frequency close to the commercial power frequency as a fixed rotational frequency. The rotational frequency selector circuit ignores the rotational frequency set by the rotational frequency setting circuit when the third timer circuit is operating, and determines the fixed rotational frequency as an output target of the inverter.

Meanwhile, a starter of the present invention is intended to start a brushless motor having a rotor. The starter includes an inverter for converting a DC voltage into an AC voltage to drive the brushless motor, a reverse induction voltage detector circuit for detecting a rotational position of the rotor from a reverse induction voltage of the brushless motor, and a commutator circuit for generation a waveform from a signal of the reverse induction voltage detector circuit to drive the inverter. The starter further includes a starting circuit for outputting a waveform required to start the brushless motor, a first compulsory output circuit for outputting for a specified time interval a waveform having a voltage and a frequency at a level at which the brushless motor does not rotate, and a switching circuit for selecting an output of the first compulsory output circuit when the brushless motor is started, then selecting an output of the starting circuit, and finally selecting an output of the commutator circuit so as to operate the inverter.

The first compulsory output circuit may be replaced by a second compulsory output circuit for outputting a waveform having a voltage and a frequency at a level at which the brushless motor does not rotate. In this case, a power closing decision circuit is provided for deciding that a power is closed. The switching circuit selects an output of the second compulsory output circuit to operate the inverter when the power closing decision circuit decides that the power is closed.

The starter may further include a decision circuit for deciding whether or not the motor operation is stabilized from the signal of the reverse induction voltage detector circuit. In this case, the second compulsory output circuit stops the output of the waveform when the decision circuit decides that the motor operation is stable.

The starter may further include a second timer circuit for starting its operation when the power is closed. In this case, the second compulsory output circuit stops the output of the waveform when the decision circuit decides that the motor operation is stable or when the second timer circuit has completed counting of a specified time interval.

DETAILED DESCRIPTION OF THE PREFERRED EMBODIMENTS

Preferred embodiments of the present invention will now be described with reference to the accompanying drawings.

Figure 1:
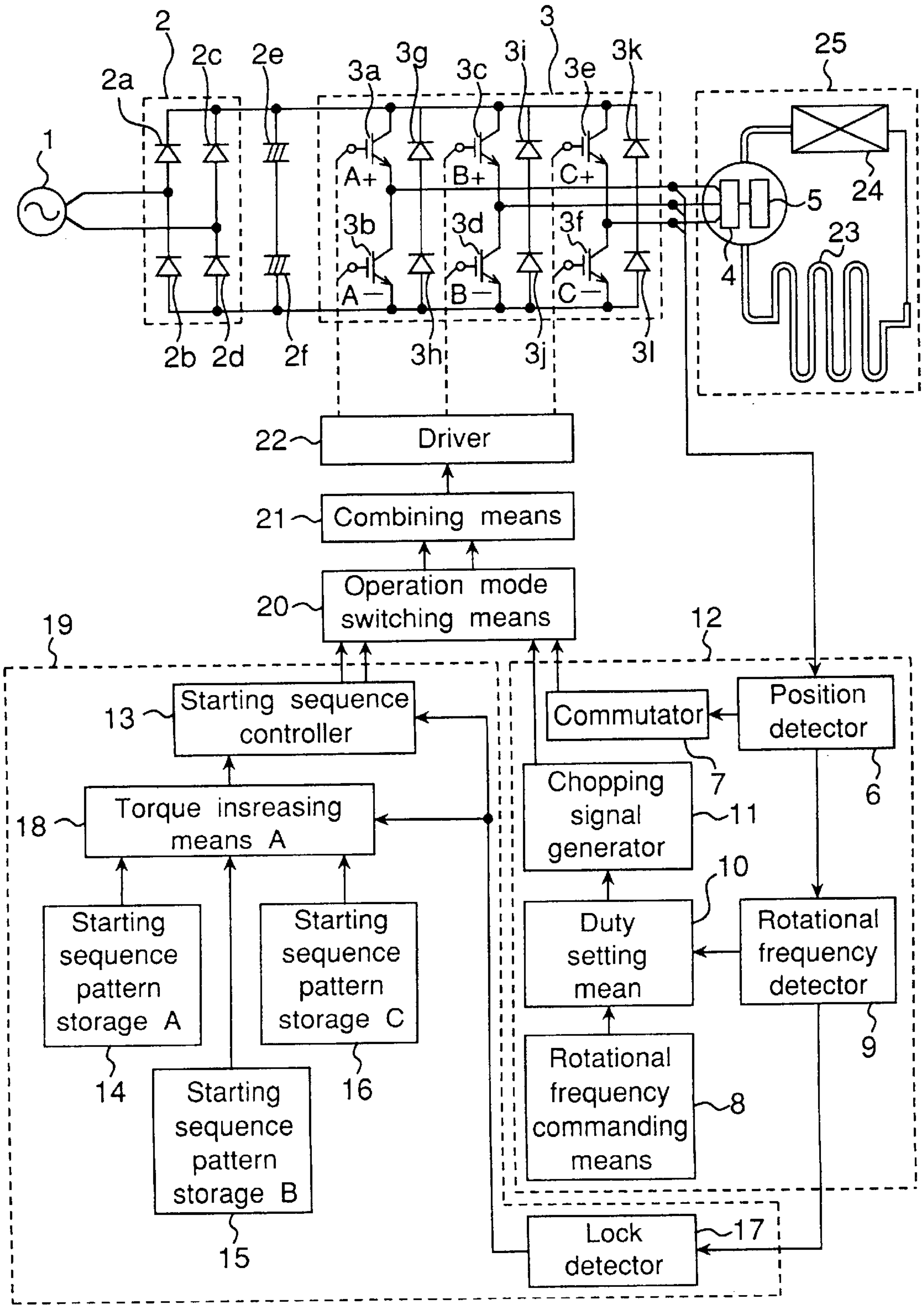
FIG. 1 is a schematic view of the total construction of a refrigerating apparatus according to a first embodiment of the present invention.

FIG. 1 is a schematic view of the total construction of a refrigerating apparatus according to a first embodiment of the present invention. In FIG. 1, a reference numeral 1 denotes an AC power source. A reference numeral 2 denotes a voltage-doubling rectifier circuit for converting the AC voltage of the AC power source 1 into a DC voltage, wherein diodes 2*a* through 2*d* and capacitors 2*e* through 2*f* are connected to one another.

A reference numeral 3 denotes an inverter circuit, wherein semiconductor switches (transistors) 3*a* through 3*f* are connected in a bridge connection style, and diodes 3*g* through 3*l* are connected inversely in parallel with respective transistors.

A reference numeral 4 denotes a DC motor which is driven by an output of the inverter circuit 3. A reference numeral 5 denotes a compressor which is driven by the DC motor 4. A reference numeral 6 denotes a position detecting means for detecting a rotational position of a rotor (not shown) of the DC motor 4 and for generating a rotational pulse so that the rotational position of the rotor may be detected from the reverse induction voltage (reverse electromotive force) of the DC motor 4.

A reference numeral 7 denotes a commutating means for a commutation pulse to commutate the semiconductor switches 3*a* through 3*f* of the inverter circuit 3 from an output of the position detecting means 6. A reference numeral 8 denotes a rotational frequency commanding means for outputting a rotational frequency command signal to the DC motor 4. A reference numeral 9 denotes a rotational frequency detecting means for counting the rotational pulse of the position detecting means 6 for a specified period (e.g., for 0.5 second).

A reference numeral 10 denotes a duty ratio setting means for outputting a duty ratio based on a difference between the rotational frequency command signal of the rotational frequency commanding means 8 and the actual rotational frequency detected by the rotational frequency detecting means 9 so that they coincide with each other. A reference numeral 11 denotes a chopping signal generating means for generating a waveform having a varying on/off ratio at a specified frequency according to the duty ratio in order to make the rotational frequency of the DC motor 4 variable.

A reference numeral 12 denotes a sensor-less operating section comprised of the position detecting means 6, commutating means 7, rotational frequency commanding means 8, rotational frequency detecting means 9, duty ratio setting means 10 and chopping signal generating means 11.

A reference numeral 13 denotes a starting sequence control means for outputting a predetermined commutation pulse and a predetermined chopping signal. The starting sequence control means is operable for outputting the commutation pulse and the chopping signal because no output can be obtained from the position detecting means 6 in the starting stage of the DC motor 4. The starting sequence control means is also operable for executing restarting for again outputting the commutation signal and the chopping signal after an elapse of a specified time interval when a lock detecting means 17 detects the locking of the compressor 5. The lock detecting means 17 is discussed later.

Reference numerals 14, 15 and 16 denote respectively a starting sequence pattern storing means A, a starting sequence pattern storing means B and a starting sequence pattern storing means C, which respectively store a starting sequence pattern A, a starting sequence pattern B and a starting sequence pattern C of the commutation pulse and the chopping signal outputted from the starting sequence control means.

Figure 2:
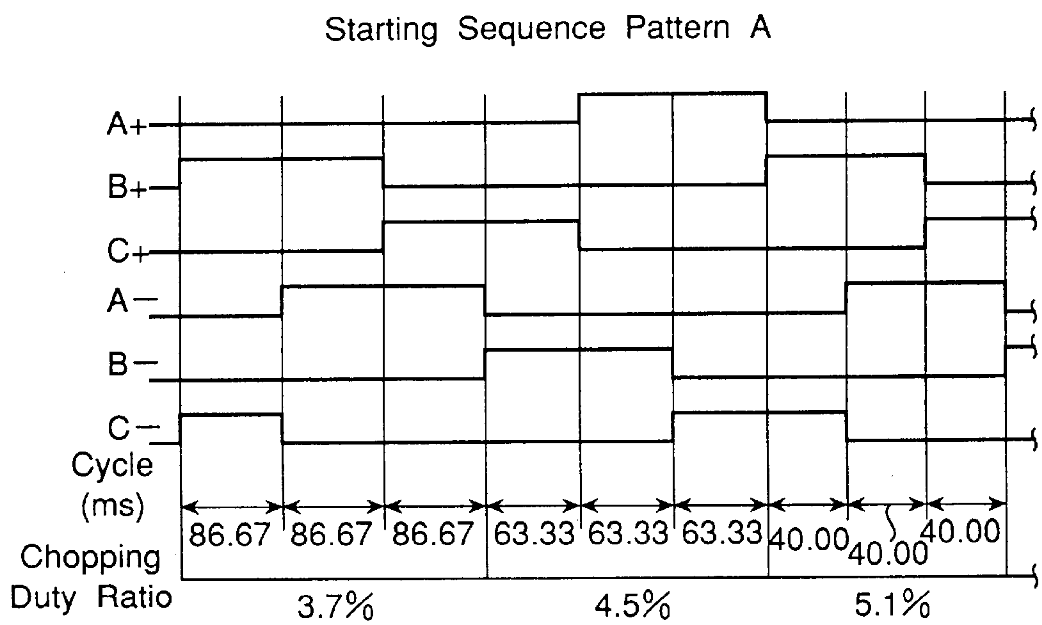
FIG. 2 is a chart showing a starting sequence pattern A of the refrigerating apparatus shown in FIG. 1.
Figure 3:
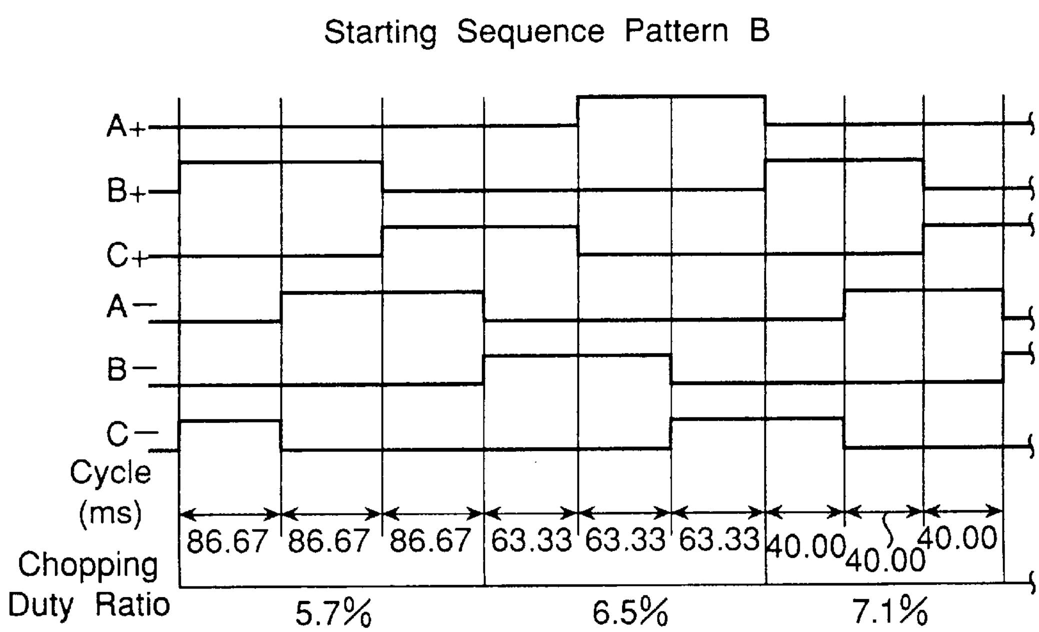
FIG. 3 is a chart showing a starting sequence pattern B of the refrigerating apparatus shown in FIG. 1.
Figure 4:
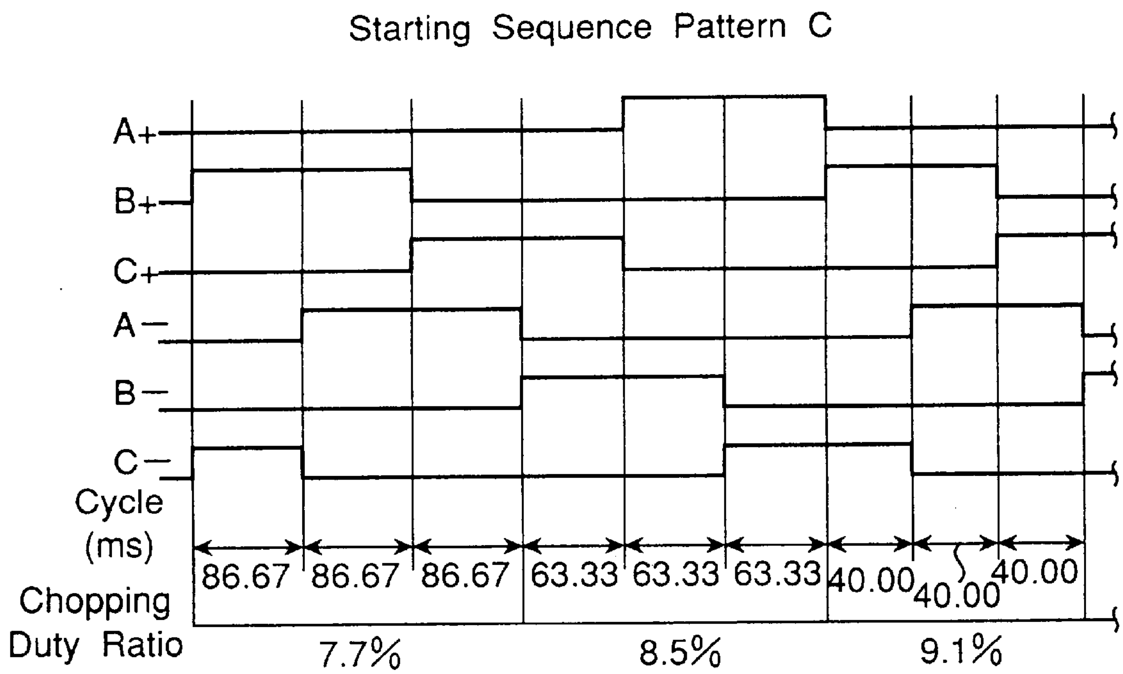
FIG. 4 is a chart showing a starting sequence pattern C of the refrigerating apparatus shown in FIG. 1.

FIGS. 2, 3 and 4 show the starting sequence pattern A, the starting sequence pattern B and the starting sequence pattern C, respectively.

In FIGS. 2, 3 and 4, reference characters A+, B+, C+, A−, B− and C− denote the commutation pulses required for operating the semiconductor switches 3*a*, 3*b*, 3*c*, 3*d*, 3*e* and 3*f*, respectively. A chopping duty ratio is an on/off ratio of the chopping signal. The chopping duty ratio increases one step by one step in the order of the starting sequence pattern A, the starting sequence pattern B and the starting sequence pattern C, and therefore, the output torque increases one step by one step.

A reference numeral 17 denotes a lock detecting means for deciding that the DC motor 4 is in a locked state when the rotational frequency of the DC motor 4 detected by the rotational frequency detecting means 9 is lower than a predetermined rotational frequency (e.g., 5 Hz), and for outputting a lock signal accordingly.

A reference numeral 18 denotes a torque increasing means A for selecting a starting sequence pattern of the smallest output torque in the starting stage, selecting a starting sequence pattern of the output torque that is greater by one step in the restarting stage, and outputting the selected pattern to the starting sequence control means 13.

A reference numeral 19 denotes a starting sequence operating section comprised of the starting sequence control means 13, starting sequence pattern storing means A14, starting sequence pattern storing means B15, starting sequence pattern storing means C16, lock detecting means 17, and torque increasing means A18.

A reference numeral 20 denotes an operation mode switching means for connecting the starting sequence control means 13 to a combining means 21 in the starting stage, and for connecting the commutating means 7 and the chopping signal generating means 11 to the combining means 21 after the motor is started. The combining means 21 is discussed later.

A reference numeral 21 denotes a combining means for combining the commutation pulse with the chopping signal.

A reference numeral 22 denotes a drive means for turning on and off the semiconductor switches 3*a* through 3*f* of the inverter circuit 3 according to an output of the combining means 21.

A reference numeral 23 denotes a condenser, and a reference numeral 24 denotes a cooler. A reference numeral 25 denotes a refrigerating-cycle section including the compressor 5, the condenser 23 and the cooler 24.

Figure 5:
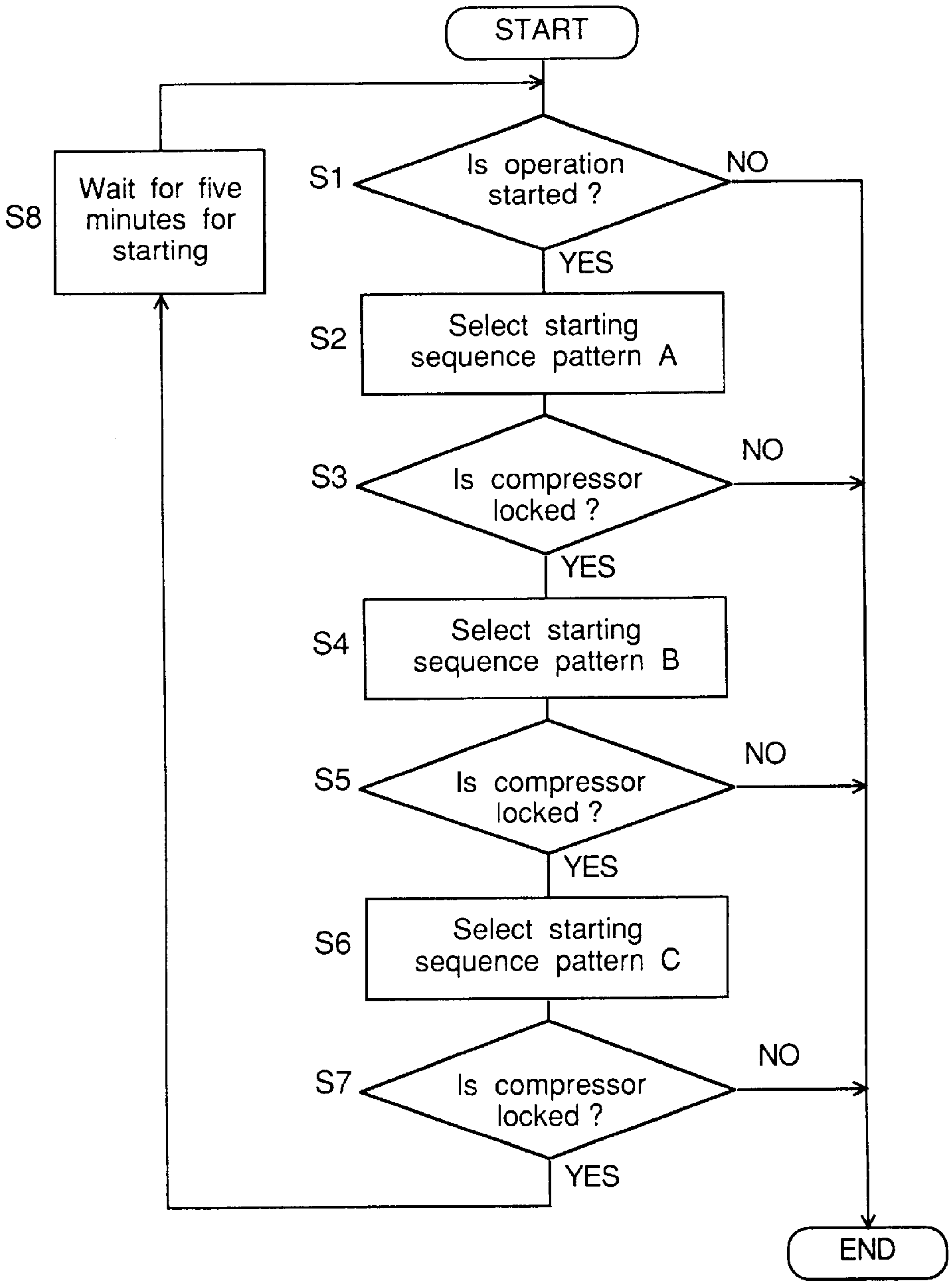
FIG. 5 is a flowchart of a starting sequence operating section of the refrigerating apparatus shown in FIG. 1.

Operation of the starting sequence operating section 19 will be described below with reference to the flowchart of FIG. 5.

First, when the apparatus is in the starting stage at step S1, the operation mode switching means 20 connects the starting sequence control means 13 to the combining means 21. Then, at step S2, the torque increasing means A18 outputs the starting sequence pattern A stored in the starting sequence pattern storing means A14 to the starting sequence control means 13, so that the compressor 5 is operated according to the starting sequence pattern of the smallest output torque.

Then, at step S3, the lock detecting means 17 decides whether or not the compressor 5 is locked. When a normal starting is achieved, the operation is completed. When the compressor 5 is locked, the program flow proceeds to step S4.

At step S4, the torque increasing means A18 outputs the starting sequence pattern B stored in the starting sequence pattern storing means B15 to the starting sequence control means 13, so that the compressor 5 is operated according to the starting sequence pattern of the output torque that is greater in magnitude by one step than the output torque pattern A.

Then, at step S5, the lock detecting means 17 decides whether or not the compressor 5 is locked. When the normal starting is achieved, the operation is completed. When the compressor 5 is locked, the program flow proceeds to step S6.

At step S6, the torque increasing means A18 outputs the starting sequence pattern C stored in the starting sequence pattern storing means C16 to the starting sequence control means 13, so that the compressor 5 is operated according to the starting sequence pattern of the output torque that is greater in magnitude by one further step than the output torque of pattern B.

Then, at step S7, the lock detecting means 17 decides whether or not the compressor 5 is locked. When the normal starting is achieved, the operation is completed. When the compressor 5 is locked, the program flow proceeds to step S8.

At step S8, there is provided a wait period before starting for a certain time interval (e.g., for five minutes), and the program flow returns to step S1.

Therefore, when the locked state of the compressor is detected at the starting, the compressor is restarted using the starting sequence pattern of the output torque that is greater in magnitude by one step than the previous pattern, thereby realizing a refrigerating apparatus which rarely causes starting failures.

Figure 6:
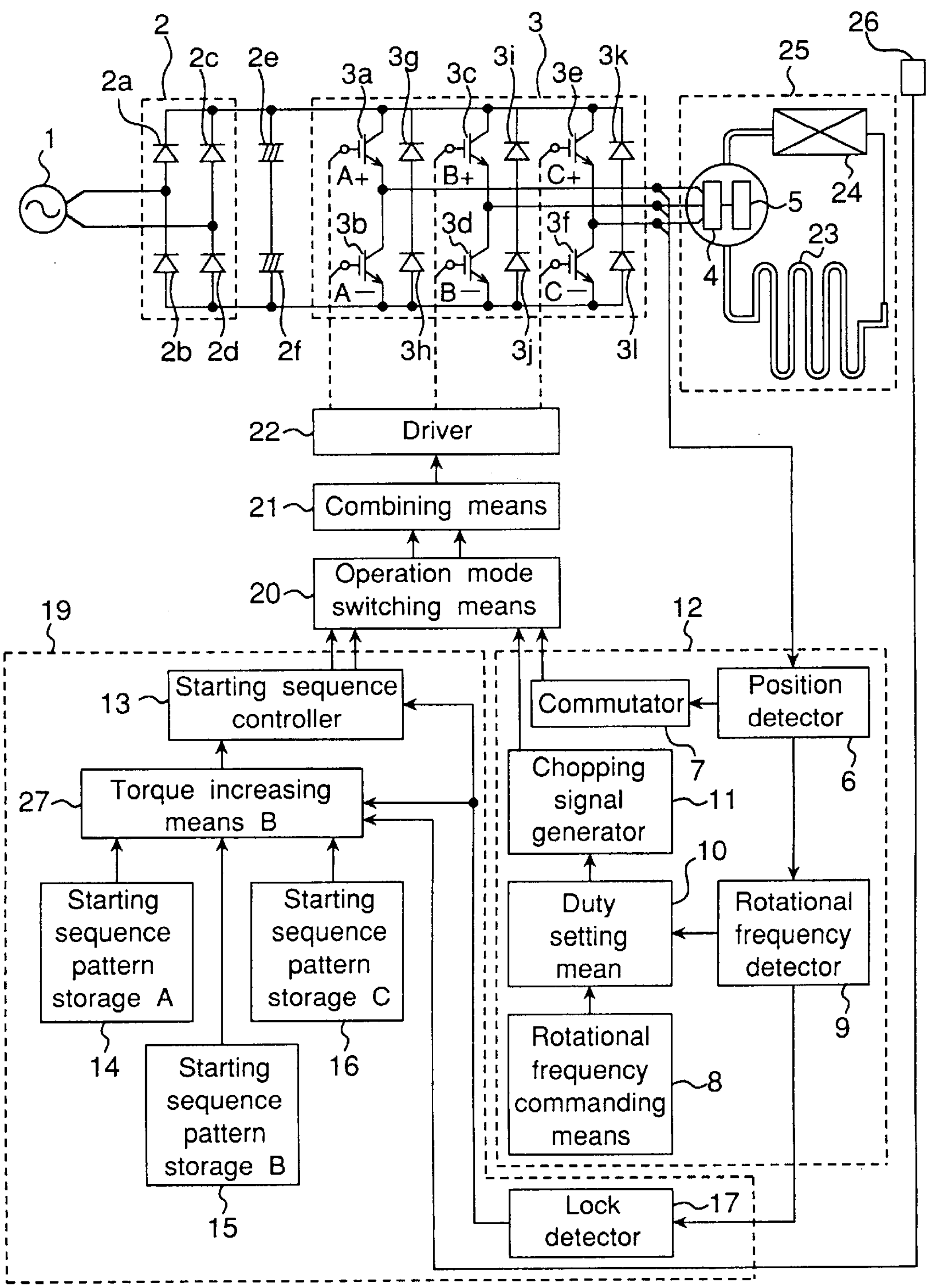
FIG. 6 is a schematic view of the total construction of a refrigerating apparatus of a modification example.

FIG. 6 shows a modification of the refrigerating apparatus shown in FIG. 1, where a torque increasing means B27 and an ambient temperature detecting means 26 are provided in place of the torque increasing means A18.

The ambient temperature detecting means 26 detects the ambient temperature of a refrigerating cycle 25, and the torque increasing means B27 compares the ambient temperature that has been detected by the ambient temperature detecting means 26 in the starting stage with a preset reference ambient temperature. As shown in Table 1, when the ambient temperature is high, a starting sequence pattern of an output torque if a great magnitude is selected corresponding to the temperature. In the restarting stage, the starting sequence pattern of the output torque that is greater in magnitude by one further step than the previous pattern is selected. The selected pattern is outputted to the starting sequence control means 13.

TABLE 1

| | |
|---|---|
| Ambient temperature < t1 | Starting sequence pattern A is selected |
| t1 ≦ Ambient temperature ≦ t2 | Starting sequence pattern B is selected |
| t2 < Ambient temperature | Starting sequence pattern C is selected |

With the above arrangement, by determining the load torque of the DC motor in the starting stage based on the ambient temperature of the refrigerating cycle and starting the motor according to the starting sequence pattern corresponding to the load torque from the beginning of operation, starting failures can be further reduced which have hitherto been caused when the load torque is great because of the high ambient temperature.

Figure 7:
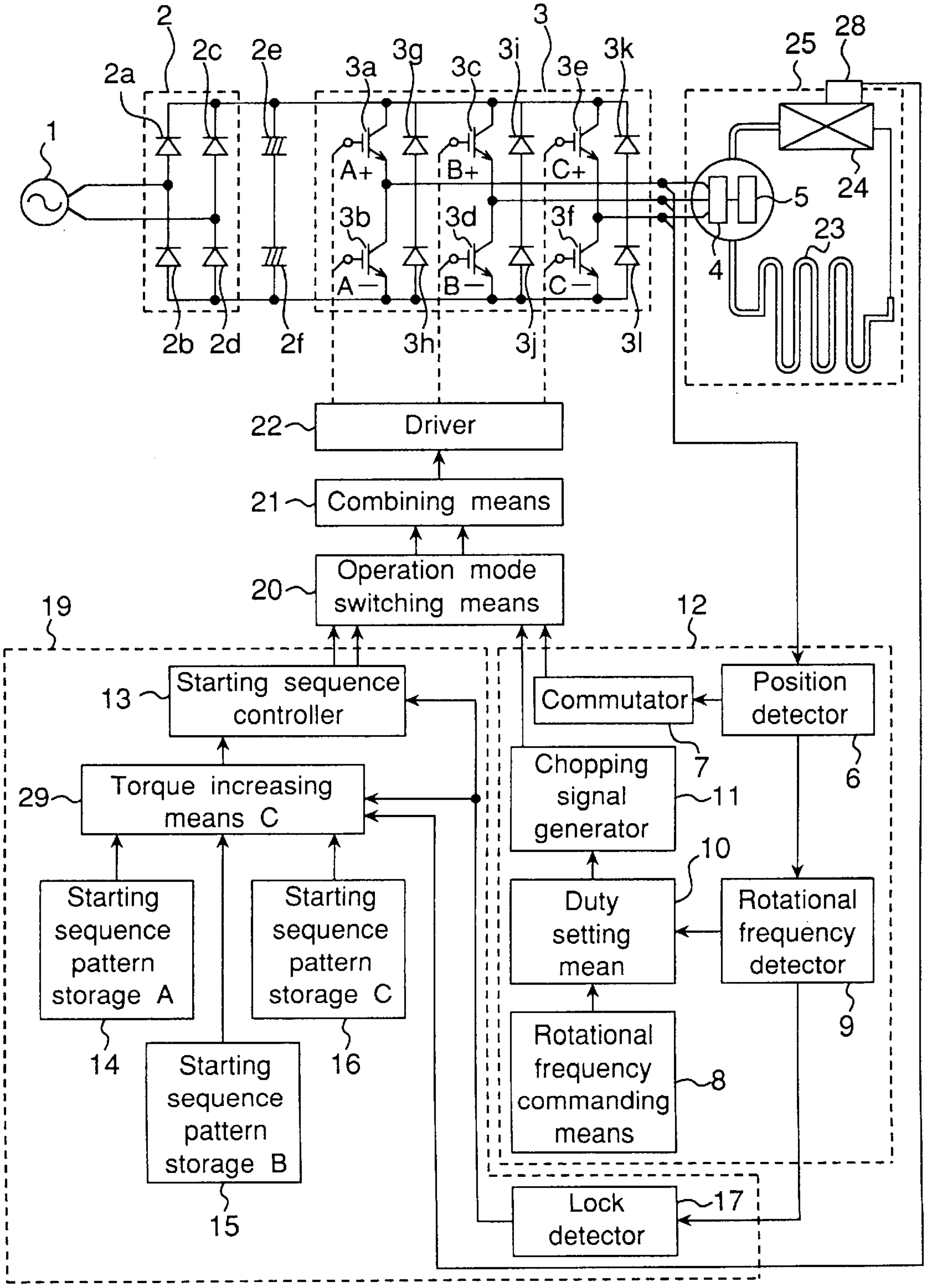
FIG. 7 is a schematic view of the total construction of a refrigerating apparatus according to a modification of the present invention.

FIG. 7 shows another modification of the refrigerating apparatus, where a torque increasing means C29 and a cooler temperature detecting means 28 are provided in place of the torque increasing means A18 of the refrigerating apparatus shown in FIG. 1.

The cooler temperature detecting means 28 detects the temperature of the cooler 24, and the torque increasing means C29 compares the cooler temperature detected by the cooler temperature detecting means 28 in the starting stage with the preset reference ambient temperature. As shown in Table 2, when the cooler temperature is high, a starting sequence pattern of an output torque of a great magnitude is selected corresponding to the temperature. In the restarting stage, the starting sequence pattern of the output torque that is greater by one further step than the previous pattern is selected. The selected pattern is outputted to the starting sequence control means 13.

TABLE 2

| | |
|---|---|
| Cooler temperature < T1 | Starting sequence pattern A is selected |
| T1 ≦ Cooler temperature ≦ T2 | Starting sequence pattern B is selected |
| T2 < Cooler temperature | Starting sequence pattern C is selected |

With this arrangement, by detecting the load torque of the DC motor in the starting stage based on the cooler temperature and starting the motor according to the starting sequence pattern correspond to the load torque from beginning of operation, an initial pull-down (occurring when the refrigerating operation is initially started) and the possible failure in the starting stage when the load torque is great after defrosting the cooler 24 or the like can be further reduced.

Figure 8:
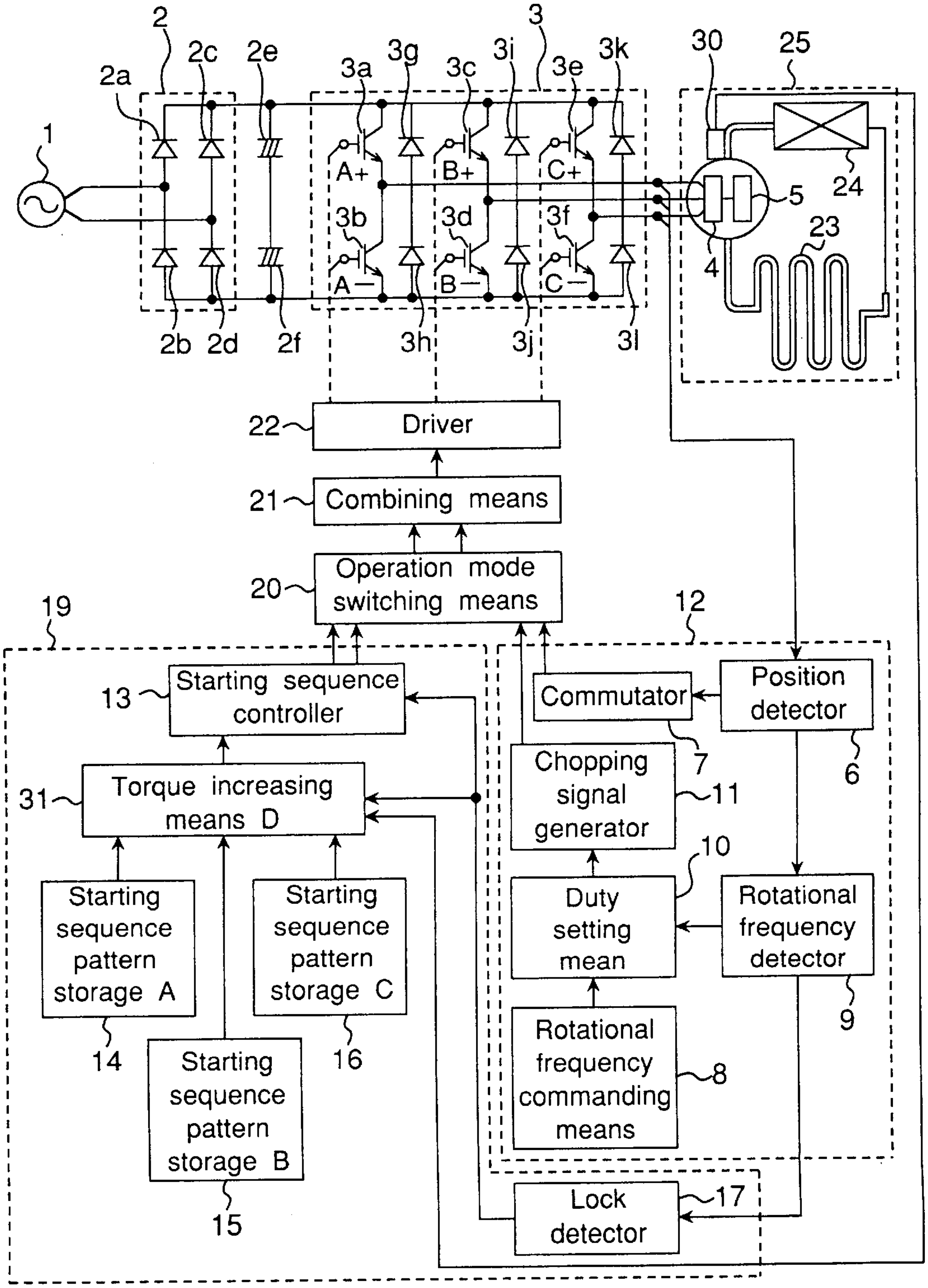
FIG. 8 is a schematic view of the total construction of a refrigerating apparatus according to another modification of the present invention.

FIG. 8 shows another modification of the refrigerating apparatus, where a torque increasing means D31 and an inlet pressure detecting means 30 are provided in place of the torque increasing means A18 of the refrigerating apparatus shown in FIG. 1.

The inlet pressure detecting means 30 detects the inlet pressure of the compressor 5, while the torque increasing means D31 compares the inlet pressure detected by the inlet pressure detecting means 30 in the starting stage with a preset inlet pressure. As shown in Table 3, when the inlet pressure is high, a starting sequence pattern of an output torque of a great magnitude is selected corresponding to the pressure. In the restarting stage, the starting sequence pattern of the output torque that is greater by one further step than the previous pattern is selected. The selected pattern is outputted to the starting sequence control means 13.

TABLE 3

| | |
|---|---|
| Inlet pressure < P1 | Starting sequence pattern A is selected |
| P1 ≦ Inlet pressure ≦ P2 | Starting sequence pattern B is selected |
| P2 < Inlet pressure | Starting sequence pattern C is selected |

With the above arrangement, by directly determining the load torque of the DC motor in the starting stage based on the inlet pressure and starting the motor according to the starting sequence pattern corresponding to the load torque from the beginning of operation, the possible starting failures when the load torque is great can be further reduced.

As described above, in the refrigerating apparatus of the first embodiment of the present invention, when the lock detecting means detects the locked state of the compressor in the starting stage, the torque increasing means A immediately selects the starting sequence pattern of the output torque that is greater by one step and outputs the pattern to the starting sequence control means, so that the compressor can be speedily restarted without repeating the starting failures. Therefore, even if the starting has initially failed due to a great load torque, the motor can be immediately restarted, resulting in a reliable refrigerating apparatus which fails little in the starting stage.

Furthermore, the torque increasing means B estimates the load torque of the DC motor 4 in the starting stage from the refrigerating cycle ambient temperature and selects the starting sequence pattern corresponding to the load torque from the beginning of operation, thereby allowing the refrigerating apparatus to positively start even if the load torque is great because of the high ambient temperature.

Furthermore, the torque increasing means C estimates the load of the DC motor in the starting stage by the cooler temperature and selects the starting sequence pattern corresponding to the load torque from the beginning of operation, thereby allowing a refrigerating apparatus to positively start even at the initial pull-down (occurring when the refrigerating operation is initially started) or even when the load torque is great after defrosting the cooler or the like.

Furthermore, the torque increasing means D directly detects the load torque of the DC motor in the starting stage based on the inlet pressure and starts the motor according to the starting sequence pattern corresponding to the load torque from the beginning of operation, thereby allowing the refrigerating apparatus to be subject to less starting failures even when the load torque is great.

Figure 9:
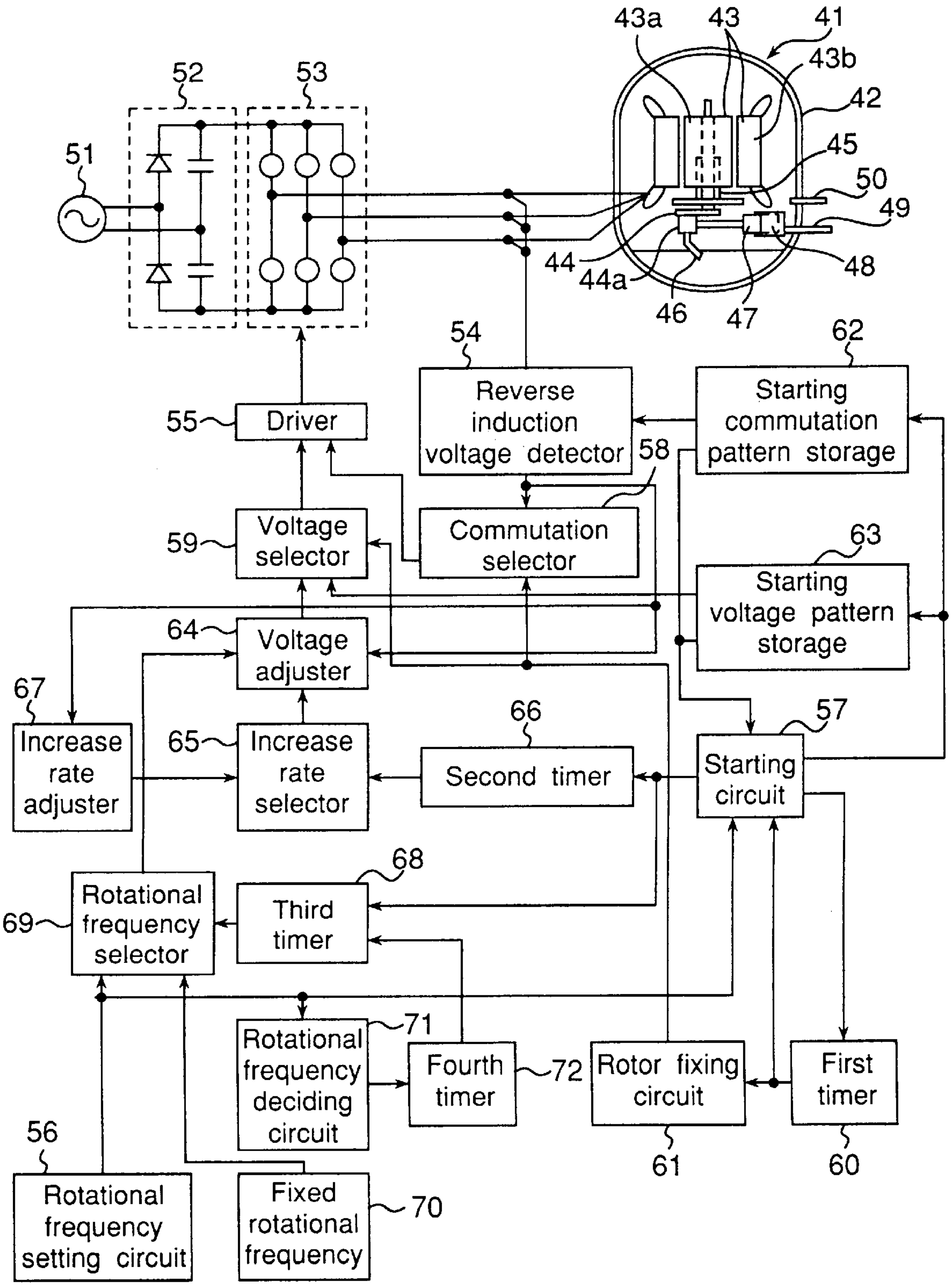
FIG. 9 is a circuit diagram of a refrigerator control device according to a second embodiment of the present invention.

FIG. 9 shows a circuit diagram of a control device according to a second embodiment of the present invention for a refrigerator adopted as a refrigerating apparatus.

In FIG. 9, a reference numeral 41 denotes a compressor, and a reference numeral 42 denotes a shell of the compressor 41. A reference numeral 43 denotes a DC motor comprised of a rotor 43*a* and a stator 43*b*. The rotor 43*a* is provided with permanent magnets arranged therearound (when, for example, the motor has four poles, poles of N, S, N and S are arranged at every 90 degrees).

A reference numeral 44 denotes a shaft which is fixed to the rotor 43*a* and journaled in a bearing 45. Further, an eccentric section 44*a* is provided below the shaft 44, and a lubricating oil pump 46 is provided further below the eccentric section 44*a*.

A reference numeral 47 denotes a piston, which undergoes a reciprocating motion inside a cylinder 48 to compress a refrigerant. A rotating motion of the shaft 44 is converted into the reciprocating motion of the piston 47 by the eccentric section 44*a*. The compressed refrigerant goes out of a discharge pipe 49 and is discharged into the shell 42 of the compressor 41 from an inlet pipe 50 through a cooling section (condenser, expander and evaporator).

A reference numeral 51 denotes a commercial power source which is, for example, a 100-V 60-Hz AC power source in an ordinary house. A reference numeral 52 denotes a rectifier circuit for rectifying the commercial power source 51. In the present case, a voltage-doubling rectifier system is adopted, where the 100 VAC is inputted and a 250 VDC is outputted.

A reference numeral 53 denotes an inverter which is constructed by connecting switchmen elements in a 3-phase bridge connection style, and operates to convert the DC output of the rectifier circuit 52 into an output of 3-phase arbitrary voltage and arbitrary frequency for electric power supply to the DC motor 43.

A reference numeral 54 denotes a reverse induction voltage detector circuit which detects a relative rotational position of the rotor 43*a* from a reverse induction voltage at the winding of the stator 43*b* of the DC motor 43. A reference numeral 55 denotes a drive circuit for turning on and off the switching elements of the inverter 53.

A reference numeral 56 denotes a rotational frequency setting circuit which detects an internal temperature of the refrigerator (e.g., a temperature in a refrigeration chamber), sets an optimum rotational frequency at that time, and outputs the frequency as a command rotational frequency. A reference numeral 57 denotes a starting circuit which transmits a signal when the output of the rotational frequency setting circuit 56 is shifted from a stop state (the command rotational frequency=0 r/sec) to an operating state (e.g., the command rotational frequency 40=r/sec) so as to decide that the apparatus is in the operating state.

A reference numeral 58 denotes a commutation selector circuit which changes the manner of commutation (changes a 3-phase output current of the inverter 53) depending on the state at that time, and outputs the resulting manner of commutation to the drive circuit 55. A reference numeral 59 denotes a voltage selector circuit which sets the output voltage of the inverter 53 depending on the state at that time, and transmits the voltage value as a PWM (Pulse Width Modulation) signal. The signal is combined with the output of the commutation selector circuit 58 in the drive circuit 55 so as to turn on and off the switching elements of the inverter 53.

A reference numeral 60 is a first timer circuit which transmits an output for a specified time based on a signal from the starting circuit 57. A reference numeral 61 denotes a rotor fixing circuit which transmits, to the commutation selector circuit 58 and the voltage selector circuit 59, a signal for selecting a specified phase and turning on the phase at a specified voltage when the first timer circuit 60 is operating.

The output of the first timer circuit 60 is fed back to the starting circuit 57. After the time counting of the first timer circuit 60 is completed, a starting signal is transmitted to a starting commutation pattern storing circuit 62 and a starting voltage pattern storing circuit 63 to start the operation. In the present case, the patterned commutation signal and the voltage signal are transmitted respectively to the commutation selector circuit 58 and the voltage selector circuit 59, according to which signals the inverter operates.

When the starting pattern is completed, the commutation selector circuit 58 begins to operate based on the output from the reverse induction voltage detector circuit 54, while the voltage selector circuit 59 begins to output a PWM output based on the output from a voltage adjuster circuit 64.

Just after the switching, a voltage equal to or slightly higher than the final voltage of the previous starting voltage pattern is set. Thereafter, the voltage increases at a rate set by an increase rate selector circuit 65.

A reference numeral 66 denotes a second timer circuit which transmits an output to the increase rate selector circuit 65 for a specified time in accordance with a timing under the command of the starting circuit 57. At this time, the increase rate selector circuit 65 selects a first increase rate during the operation of the second timer circuit 66, and selects a second increase rate after the operation of the second timer circuit 66 is completed. In the present case, there is the setting of: the first increase rate <the second increase rate.

A reference numeral 67 denotes an increase rate adjuster circuit which has a function of calculating the rotational frequency of the DC motor 43 from the output of the reverse induction voltage detector circuit 54 and adjusting the second increase rate of the increase rate selector circuit 65 so that a rise time to a specified rotational frequency falls within a specified time interval.

A reference numeral 68 denotes a third timer circuit which transmits an output to a rotational frequency selector circuit 69 for a specified time in accordance with a timing under the command of the starting circuit 57. At this time, the rotational frequency selector circuit 69 selects not the command rotational frequency determined by the rotational frequency setting circuit 56 but a fixed rotational frequency 70 during the operation of the third timer circuit 68. The fixed rotational frequency 70 is set around the commercial power frequency. After the operation of the third timer circuit 68 is completed, the rotational frequency obeys the command rotational frequency of the rotational frequency setting circuit 56.

A reference numeral 71 denotes a rotational frequency deciding circuit which transmits an output when the command rotational frequency of the rotational frequency setting circuit 56 is a specified rotational frequency (rotational frequency lower than the commercial power frequency). A reference numeral 72 denotes a fourth timer circuit which operates based on the output of the rotational frequency deciding circuit 71, and transmits an output for operating the third timer circuit 68 after completing time counting for a specified time.

Operation of the refrigerator control device of the above-described construction will be described below.

First, operation of the compressor 41 shown in FIG. 9 will be described.

With the rotation of the rotor 43*a* of the DC motor 43, the shaft 44 rotates simultaneously. The rotor 43*a* and the shaft 44 are completely fixed to each other (by shrinkage fitting or press fitting). The shaft 44 is supported by the fixed bearing 45 in slidable contact therewith.

Below the shaft 44 is provided the eccentric section 44*a* that rotates eccentrically according to the rotation of the shaft 44. This eccentric rotation is converted into a reciprocating motion to make the piston 47 reciprocate inside the cylinder 48 to compress the refrigerant.

Further, below the eccentric section 44*a* of the shaft 44 is mounted the lubricating oil pump 46, which is implemented by a pump taking advantage of a centrifugal force in the present embodiment. This pump is often used since it has a very simple construction and a high reliability.

The lubricating oil pump 46 is to supply a lubricating oil reserved at the bottom of the shell 42 to each portion of the compressor, and the pump performs an especially important lubricating operation with regard to sliding portions between the shaft 44 and the bearing 45.

However, since the lubricating oil pump 46 is taking advantage of the centrifugal force of the rotation, it has the problem that its lubricating ability varies significantly depending on its rotational frequency.

On the other hand, a great number of refrigerators and air conditioners are commercially available these days, the refrigerating system performance of which is made variable depending on the state of a refrigeration load by varying the rotational frequency of the compressor thereof by means of an inverter. In these machines, rotary or scroll compressors are generally employed.

A main reason for such use is that the rotary or scroll compressors effect compression by utilizing the rotating motion as it is, and therefore, the refrigerating ability can be varied within a wide range when its speed is variable. Another reason is that the lubricating ability is influenced less by the rotational frequency because there is effected a differential pressure lubricating operation (effected limitedly in a high-pressure shell type compressor in which the shell has its internal pressure approximately equal to the pressure of an exhaust gas).

However, as a result of analyzing a great amount of data for the promotion of analysis, the present inventor paid attention to the following points.

That is, in each case of the rotary and scroll compressors, the efficiency of the compressor gradually reduces at a low rotational frequency. It has been discovered that the degree of reduction in efficiency is greater than the degree of reduction in efficiency of the motor itself at a low speed.

Detailed analysis has been further conducted, and it has been consequently discovered that the phenomenon is attributed to the leakage heat loss. It has been well known that the refrigerant gas leaks from between the piston and the cylinder in each compressor. However, in each case of the rotary and scroll compressors where the shell has a high internal pressure, the refrigerant gas leaks in a direction from inside the shell to the inside of a compression chamber, and therefore, a leakage heat loss occurs due to the refrigerant gas having a high temperature and a high pressure, resulting in a reduction in compression efficiency.

On the other hand, it has been discovered that the leakage of the refrigerant gas occurs regardless of the rotational frequency, and therefore, a rate of the leakage heat loss due to the leakage of the refrigerant gas increases when the compressor has a small refrigerating ability at a low rotational frequency, resulting in a reduction in efficiency.

Therefore, the present inventor paid attention to a rotational frequency control by a low-pressure shell type compressor, in which the shell has its internal pressure approximately equal to that of the inhalation gas. In the case of the low-pressure shell type compressor, the shell has a low internal pressure and the internal pressure of the shell is always lower than the internal pressure of the compression chamber. Because of this, the refrigerant gas leaks in a direction from inside the compression chamber to the inside of the shell. Although the leakage leads to a reduction of a volumetric efficiency, the compression efficiency does not reduce since there is no leakage heat loss.

In order to verify the above contents, an experiment was conducted by using a reciprocating compressor as a low-pressure shell type compressor. Results of the experiment are shown in FIGS. 11A and 11B.

Figure 11A:
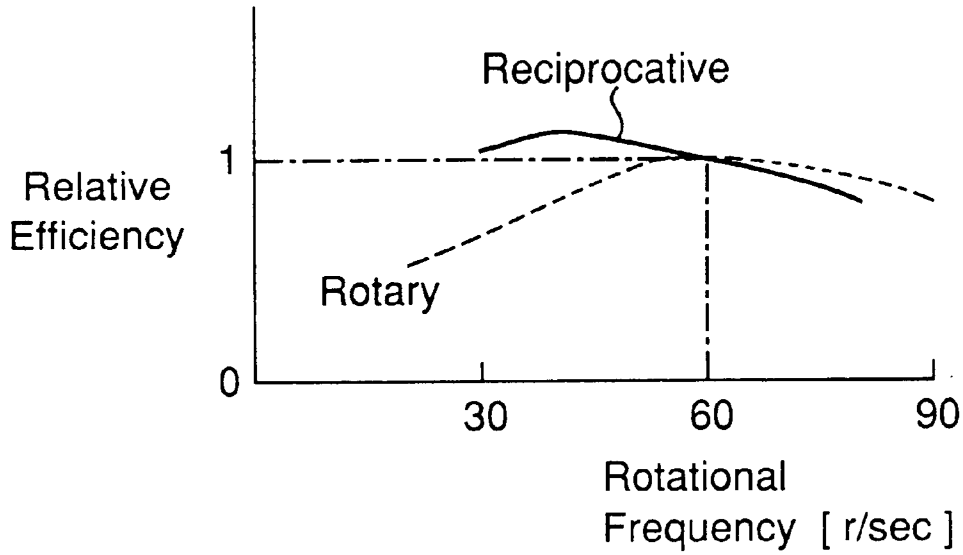
FIG. 11A is a graph showing the characteristics of a relative efficiency of a compressor.
Figure 11B:
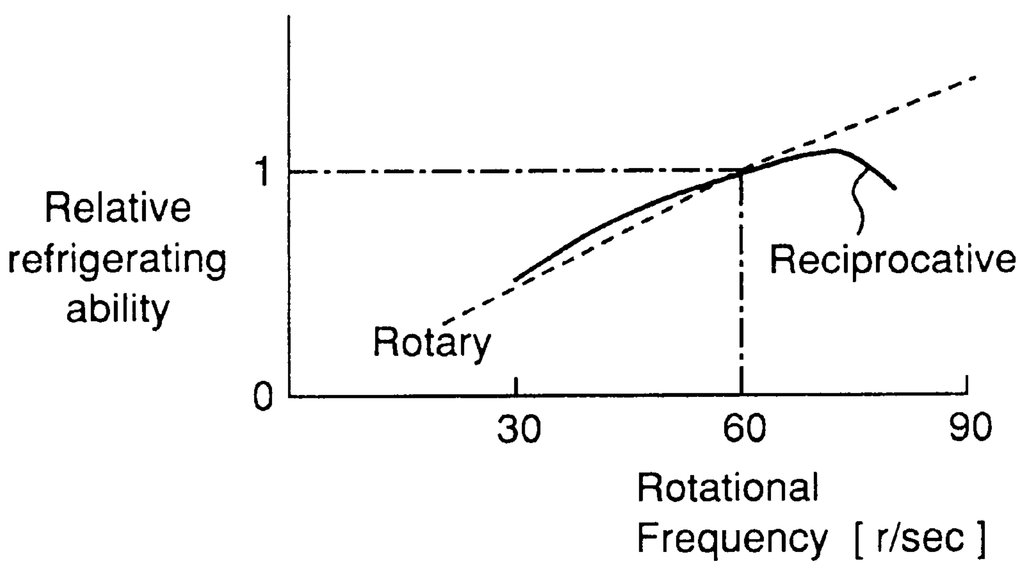
FIG. 11B is a graph showing the characteristics of a relative refrigerating ability of the compressor.

FIGS. 11A and 11B indicate graphs of rotational frequency characteristics of the compressor. FIG. 11A is a graph showing the characteristics of a rotational frequency to a relative efficiency (the efficiency at a rotational frequency of 60 r/sec is assumed to be 1), while FIG. 11B is a graph showing the characteristics of a rotational frequency to a relative refrigerating ability at the rotational frequency of 60 r/sec is assumed to be 1).

In these figures, the characteristics of the reciprocating compressor are indicated by solid lines, while the characteristics of the rotary compressor are indicated by dotted lines. The reciprocating compressor in this case is a low-pressure shell type, while the rotary compressor is a high-pressure shell type.

First, the relative efficiency shown in FIG. 11A will be described. In the rotary compressor, the efficiency significantly reduces as the rotational frequency is lowered with the efficiency peaked at the rotational frequency of 60 r/sec. On the other hand, the reciprocating compressor exhibits such a characteristic that extends approximately horizontally at a rotational frequency within a range from 60 r/sec to 40 r/sec though a peak of the efficiency exists at and around the rotational frequency of 40 r/sec.

The relative refrigerating ability shown in FIG. 11B will be described next. In the rotary compressor, the refrigerating ability varies approximately linearly to the variation of the rotational frequency However, in the reciprocating compressor, the refrigerating ability varies approximately linearly at a low rotational frequency (in a range from 30 r/sec to 60 r/sec), but it peaks in its saturation state and reduces at a rotational frequency that is not lower than 60 r/sec. This is because the inlet valve of the cylinder cannot sufficiently respond.

As a result, it has been found that the rotational frequency control of the reciprocating compressor exhibits a very high efficiency though it has a small variable range of the refrigerating ability. The above means that a very good system can be provided for limited applications. Therefore, it is proposed here to mount the compressor to a refrigerator as an application.

Any refrigerator has a body limited to a specified size, and its internal load varies depending on foods and the like. However, when the load is sufficiently cooled, there is only required a refrigerating ability such that it can cope with only the entry of heat through the body and so forth. The above means that there is no problem even when the range of variation of the refrigerating ability is small.

Furthermore, differing from other household electrical appliances, the refrigerator is always operated on the power throughout the year, and therefore, a great effect can be produced when energy saving is achieved. Therefore, a system having a higher efficiency is demanded.

In the present case, the reciprocating compressor is selected as the objective low-pressure shell type compressor. However, as is apparent from the principle that the efficiency is high at a low rotational frequency, the same is true for every compressor having a low pressure inside the shell.

However, as described hereinbefore, a great number of centrifugal pumps that are greatly influenced by the rotational frequency have been used as lubricating oil pumps in low-pressure shell type compressors. Therefore, much care must be taken to the lubrication at a low rotational frequency.

Furthermore, though there is a method of providing an independent pump, this method requires a very complicated construction, causing a cost increase and a reduced reliability. Therefore, it is a very serious problem to compensate for the lubricating ability with a scheme of control.

Figure 10A:
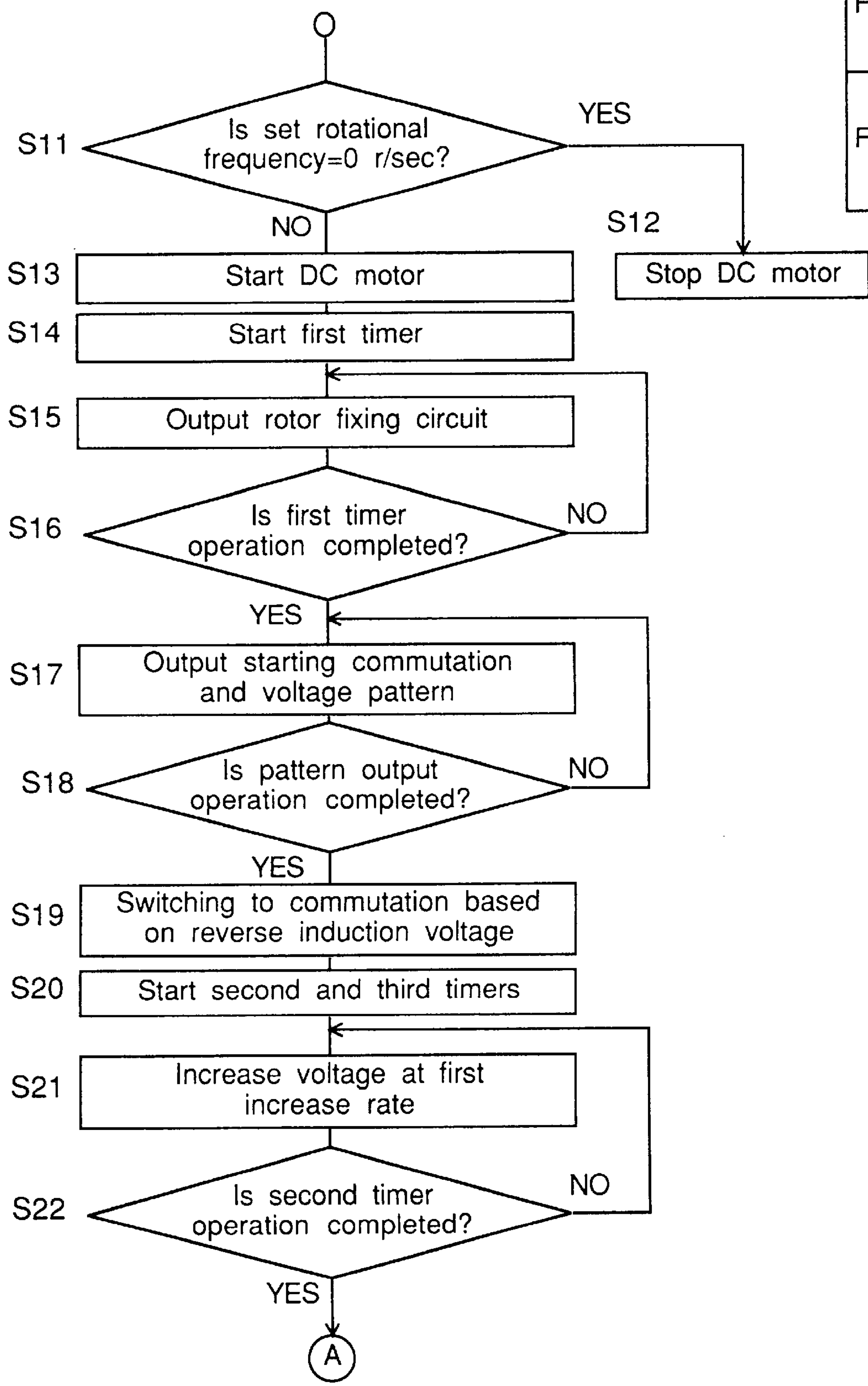
FIGS. 10A and 10B are a flowchart of the operation of the control device shown in FIG. 9.
Figure 10:
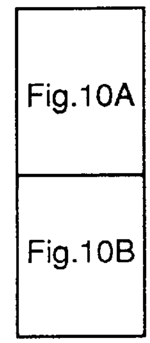
FIG. 10 shows the alignment of FIGS. 10A and 10B.
Figure 10B:
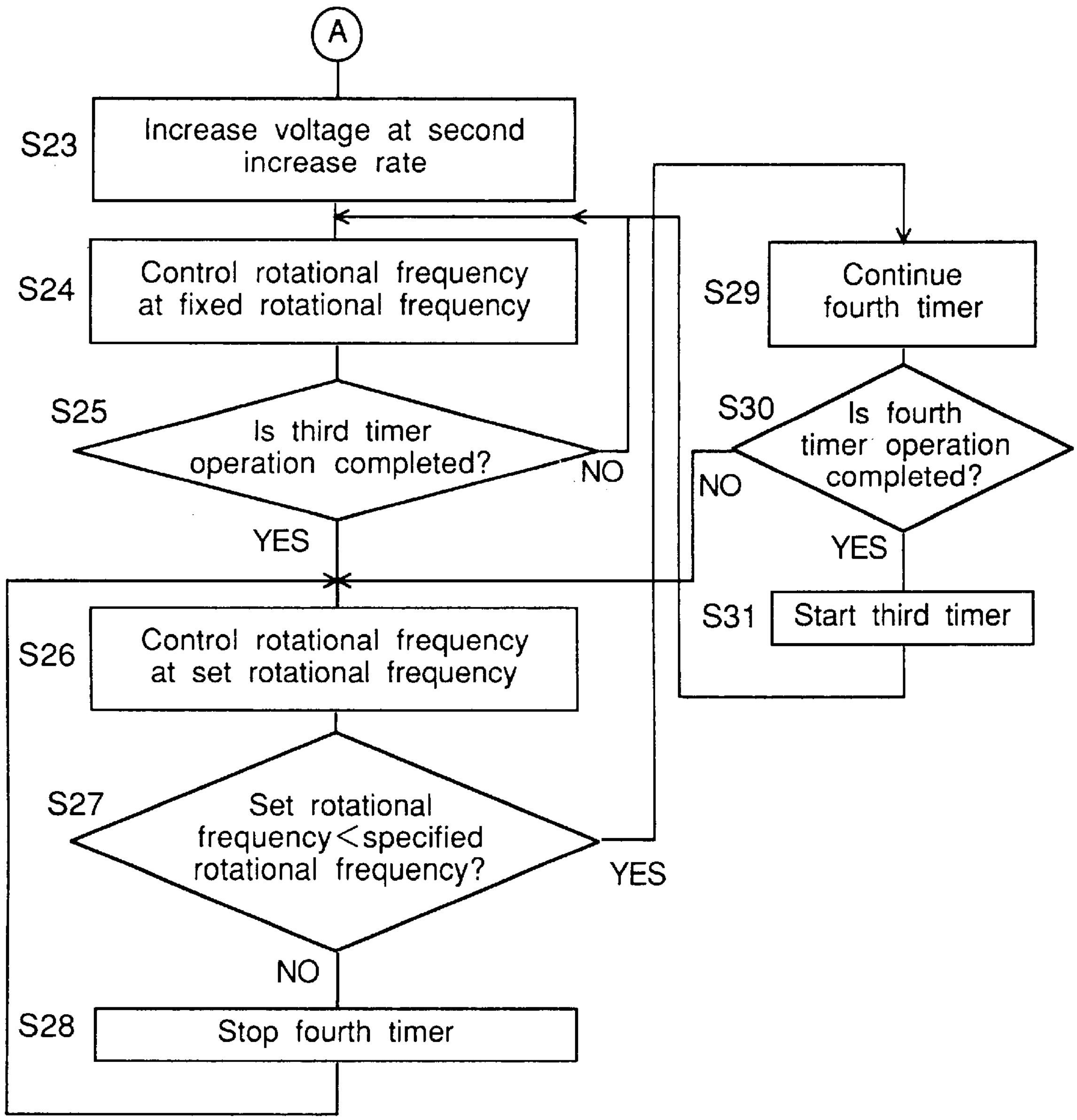

Next, operation of the refrigerator control device constructed as shown in FIG. 9 will be described with reference to FIGS. 9 and 10A and B. FIGS. 10A and B illustrate a flowchart indicative of the operation of the refrigerator control device according to a second embodiment.

The DC motor 43 is now in its stop state. It is decided at step S11 whether or not the set rotational frequency from the rotational frequency setting circuit 56 is 0 r/sec. When the set rotational frequency is 0 r/sec, the stop state of the DC motor 43 is maintained at step S12.

When the set rotational frequency becomes other than 0 r/sec (e. g., 40 r/sec), the program flow proceeds to step S13. At step S13, it is decided that the operation is started in the starting circuit 57, and a signal is transmitted to the first timer circuit to start the operation of the DC motor 43.

A supplementary Explanation will be added here. In general, a DC motor (DC brushless motor) has a position detecting sensor (e.g., a Hall element) for detecting the rotational position of its rotor. However, in a degraded environment in which a high temperature or the like exists such as the inside of a compressor, there remains a problem in terms of reliability.

In view of the above, a method of detecting the relative position of the rotor based on a reverse induction voltage at a winding of the motor has been recently proposed. The method is to make use of the excellent characteristics of the DC motor without using any sensor.

However, this method is a method of detecting the reverse induction voltage, and therefore, the position detection cannot be effected when the motor is stopped. Therefore, in order to start the DC motor, there is widely used a method of starting the DC motor as a synchronous motor in the initial state. This method is a method of compulsorily rotating the motor by applying a specified frequency and a specified voltage (this is referred to as a starting sequence).

The method is to increase the rotational frequency of the DC motor to a frequency at which the reverse induction voltage can be detected in the starting sequence and then switch the operation to the normal operation.

However, during the period of the starting sequence where the motor is operating as a synchronous motor, the rotation of the rotor and the output of the inverter do not always coincide with each other, and therefore, the motor is very unstable in terms of torque. Furthermore, after effecting the switching to the reverse induction voltage detection signal, the level of the reverse induction voltage is low when the rotational frequency is low, meaning that the state of operation is unstable.

In the case of the rotary compressor or the like, it is relatively easy to adopt a DC motor for the reason that only a small starting torque is required structurally and no great amount of torque is required because the compressing work is not started immediately after the start of rotation.

However, in the case of the reciprocating compressor, a relatively great amount of starting torque is required structurally, and also a great amount of torque is required to start the compressing work.

The supplementary explanation is as above, and the explanation will return to the present operation.

At step S14, the operation of the first timer circuit 60 is started. When the first timer circuit 60 is operating, the rotor fixing circuit 61 is operated at step S15. At step S16 it is decided whether or not the operation of the first timer 60 is completed. When the operation is not completed, the operation of step S15 is repeated. When the operation is completed, the program flow proceeds to step S17.

The rotor fixing circuit 61 operates as follows. Assuming that the input terminals of a 3-phase DC motor are U-phase, V-phase and W-phase, then a specified voltage is applied to a predetermined phase to flow a current. Then, a specified magnetic field is generated inside the stator 43*b*. According to the magnetic field, the stator 43*b* stops in a specified position.

The specified position is preferably set at the position where the compressing section of the compressor 41 has the minimum starting torque. In the case of the reciprocating compressor, the specified position is located at two positions, one position being located at the place where the piston 47 comes proximate to the cylinder 48 (top dead center), and the other position being located at the place where the piston 47 conversely comes most away from the cylinder 48 (bottom dead center).

Further, the rotor 43*a* drawn in the magnetic field is rotating with a damped oscillation, and therefore, it is preferred to operate the rotor fixing circuit 61 until the rotor completely stops. In regard to a specified time in the first timer circuit 60, a time is set which is not less than a time that is required for the damped oscillation of the rotor 43*a* to completely stop.

When the rotor 43*a* stops at a specified position and the operation of the first timer circuit 60 is completed, then a starting sequence is started so that a rotating magnetic field is generated from the specified position fixed by the rotor fixing circuit 61 (step S17).

The starting commutation pattern storing circuit 62 stores a pattern for successively switching the switching elements of the inverter 53. Further, the starting voltage pattern storing circuit 63 stores an optimum voltage for yielding an output according to the output frequency of the starting commutation pattern.

Figure 12:
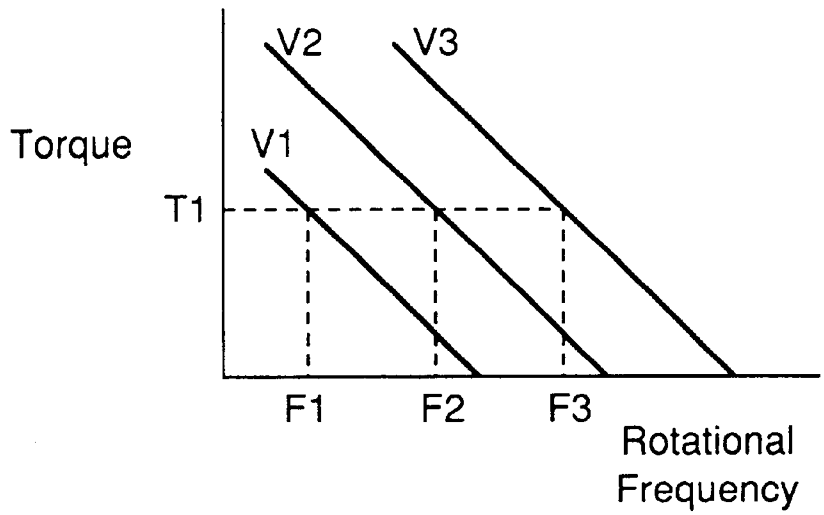
FIG. 12 is a graph showing the characteristics of a relation between the rotational frequency and the torque of a motor serving as a synchronous motor.

The manner of deciding the pattern preparatorily stored in the starting commutation pattern storing circuit 62 and the starting voltage pattern storing circuit 63 will be described below with reference to FIG. 12. FIG. 12 shows a graph of characteristics of the rotational frequency and the torque of the motor serving as a synchronous motor.

The characteristics shown in FIG. 12 plot the maximum torque when a specified rotational frequency and a specified voltage are outputted from the inverter. That is, the characteristics are obtained when the DC motor is operated as a synchronous motor by the inverter. The pattern is determined from the characteristics.

As described above, in the case of the reciprocating compressor, a great amount of torque is required from the initial stage of rotation. Since the state of the starting sequence is unstable in terms of operation, the operation is required to be switched to the operation based on the reverse induction voltage detection signal as fast as possible. It is preferred to switch the operation within two turns of the rotor.

In order to smoothly turn the DC motor in such a short time, the setting of a generated torque becomes important. When the generated torque is too small, the DC motor does not rotate. In contrast, when the generated torque is too great, a brake torque is generated to hinder a smooth acceleration, and this frequently results in a switching failure.

Therefore, for the achievement of the smooth starting, there is a method of measuring the characteristics as shown in FIG. 12 and setting a pattern, which will be described below. A generated torque TI of the DC motor is set to a value that is about ten percent higher than a required starting torque. The voltage and the rotational frequency are patterned according to the torque.

In FIG. 12, the pattern was set as follows. After performing a half turn at a rotational frequency F1 and a voltage VI, a half turn at a rotational frequency F2 and a voltage V2 and a half turn at a rotational frequency F3 and a voltage V3, the operation is switched to the operation based on the reverse induction voltage detection signal. That is, the starting sequence is completed in one and a half turn.

At step S18, it is decided whether or not a pattern output operation is completed. When the operation is not completed, the operation of step S17 is repeated. When the operation is completed, a completion signal is transmitted from the starling commutation pattern storing circuit 62 and the starting voltage pattern storing circuit 63 to the starting circuit 57, the commutation selector circuit 58 and the voltage selector circuit 59. Thereafter, the program flow proceeds to step S19.

At step S19, the output of the commutation selector circuit 58 is switched from the operation that has been executed by the starting commutation pattern storing circuit 62 to the operation to be executed by the reverse induction voltage detector circuit 54. By this operation, the DC motor is put in its normal operation state (operation by position detection or the like).

Then, at step S20, the operations of the second timer circuit 66 and the third timer circuit 68 are started. At step S21, the increase rate selector circuit 65 selects the first increase rate and transmits the same, and upon receiving it, the voltage adjuster circuit 64 gradually increases the voltage and the rotational frequency.

At step S22, it is decided whether or not the operation of the second timer circuit 66 is completed. When the timer circuit is operating, the operation of step S21 is repeated. When the operation is completed, the program flow proceeds to step S23. At step S23, the increase rate selector circuit 65 selects the second increase rate and transmits the same, and upon receiving it, the voltage adjuster circuit 64 gradually increases the voltage and the rotational frequency.

The first increase rate and the second increase rate will be described below. The output of the reverse induction voltage detector circuit 54 is unstable when the rotational frequency is low, and a great amount of torque is applied from the initial starting stage in the reciprocating compressor as described hereinbefore. Therefore, the increase rate should be determined such that the motor operation passes the region in which the rotational frequency is low as fast as possible.

However, when the voltage is increased too rapidly, the output of the reverse induction voltage detector circuit 54 does not sufficiently follow the voltage, and this sometimes results in a step-out and stoppage of the motor. Therefore, a rate obtained by compromising both the factors is the second increase rate.

On the other hand, the motor operation is especially unstable just after the operation is switched from the starting sequence, and it can be considered that the rotation cannot be achieved due to an excessively great amount of starting torque in the starting sequence. Increasing the voltage at a high increase rate in such a case may be accompanied by an abrupt increase of a current, and therefore, this is very dangerous. In particular, a fatal failure such as damage of the switching elements and demagnetization of the rotor magnet of the DC motor will possibly result.

Therefore, the first increase rate is set just after effecting the switching, and it is confirmed that the motor is surely rotating within the operating time of the second timer circuit 66. Only when the motor is surely rotating is the operation switched to the second increase rate. That is, the first increase rate is set slower than the second increase rate.

Next, at step S24, the rotational frequency selector circuit 69 selects the fixed rotational frequency 70 regardless of the command rotational frequency of the rotational frequency setting circuit 56, and therefore, the voltage adjuster circuit 64 executes a rotational frequency control so as to make it conform to the fixed rotational frequency 70.

Since the rotational frequency control is performed by voltage control in the DC motor, the voltage adjuster circuit 64 obtains the current-time rotational frequency from the output of the reverse induction voltage detector circuit 54 and adjusts the voltage so as to make it conform to the voltage.

Next, at step S25, it is decided whether or not the operation of the third timer circuit 68 is completed. When the timer circuit is operating, the operation of step S24 is repeated. When the operation is completed, the program flow proceeds to step S26. At step S26, upon receiving an operation completion signal of the third timer circuit 68, the rotational frequency selector circuit 69 selects the command rotational frequency of the rotational frequency setting circuit 56 and transmits the same to the voltage adjuster circuit 64.

Figure 13:
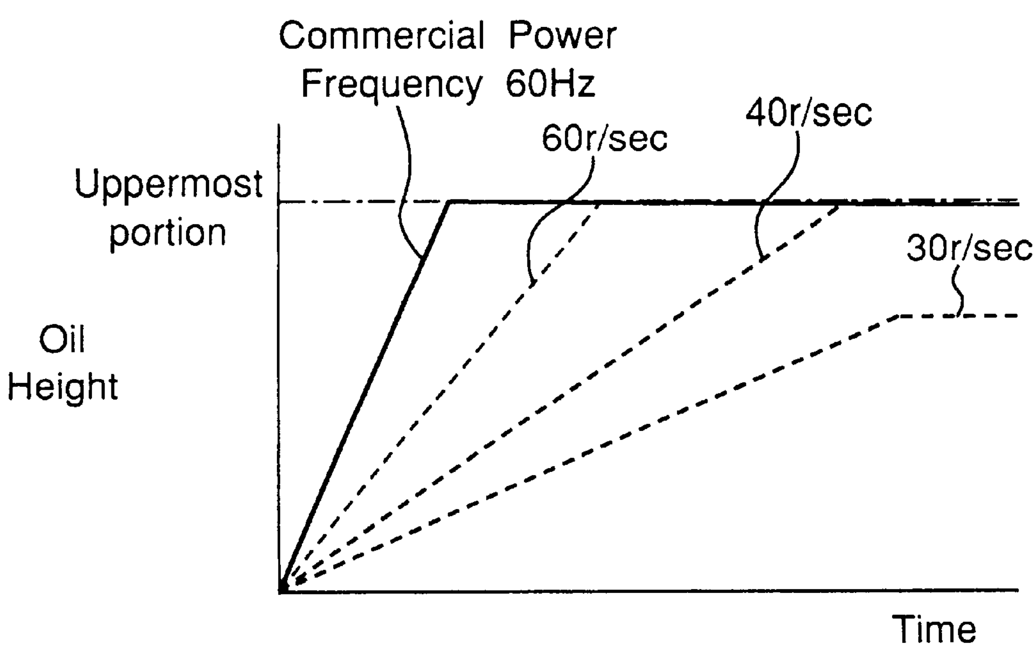
FIG. 13 is a graph showing the characteristics of a lubricating ability of a lubricating oil pump.

In the present case, a fixed rotational frequency 70 is set to a rotational frequency close to the rotational frequency of the motor operation at the commercial power frequency. The reason for this will be described with reference to FIG. 13. FIG. 13 is a graph showing the characteristics of the lubricating ability of the lubricating oil pump.

It can be found that, with regard to the lubricating ability when a normal inverter is not used, the initial lubrication is achieved most rapidly because the rise of the rotational frequency is very fast. When an inverter is used, the initial lubrication is slow because the rise speed is slow even at the same rate of 60 r/sec as that of the current one.

Furthermore, the lubricating ability has a significant variation depending on the rotational frequency because the lubricating oil pump is a centrifugal pump, and therefore, the initial lubrication is slow at a rate of 40 r/sec. It can be found that the lubricating ability itself disappears when the rate becomes 30 r/sec, and the oil cannot reach the uppermost portion.

It is to be noted that FIG. 13 shows the characteristics when the motor is started at each rotational frequency. For example, when the initial lubrication is performed at the rate of 60 r/sec and the rotational frequency is lowered to the rate of 30 r/sec, the oil reaches the uppermost portion by the operation of the surface tension of the oil.

Therefore, when the motor is started at the fixed frequency (e. g., at the rate of 60 r/sec) in the starting stage, the lubricating ability can be assured even in the subsequent low-speed operation (e.g., at the rate of 30 r/sec).

The increase rate adjuster circuit 67 watches the state of the starting sequence, measures a time interval from the start to the achievement of the rotational frequency equal to the commercial power frequency (assumed to be 50 r/sec here), and adjusts the second increase rate so that the time interval falls within a time interval that is two times as long as the time interval in which the oil reaches the uppermost portion at the commercial power frequency of 60 Hz in FIG. 13.

Because the oil reaches the uppermost portion within the time interval that is two times as long as the time interval corresponding to the commercial power frequency, the time period of a sliding motion in a state in which no lubrication is effected doubles that of the current one. However, because the motor operates at a low rotational frequency in the stable operating stage of the refrigerator, the frequency of turning on and off the compressor itself is reduced half and, eventually, the distance of the sliding motion is the same, meaning that the state of abrasion is suppressed to the same level as that of the prior art.

Next, at step S27, it is decided whether or not the set rotational frequency is lower than the specified rotational frequency. When the set rotational frequency is higher than the specified rotational frequency, the operation of the fourth timer circuit 72 is stopped at step S28. In contrast, when the set rotational frequency is lower than the specified rotational frequency, the operation of the fourth timer circuit 72 is continued at step S29.

In the present case, the specified rotational frequency means a rotational frequency at which the lubricating ability as shown in FIG. 13 is very low, and the rotational frequency is set to, for example, 30 r/sec.

Next, at step S30, it is decided whether or not the operation of the fourth timer circuit 72 is completed. When the operation is not completed, the operation is repeated from step S26. When the operation is completed, the third timer circuit 68 is restarted at step S31, and the operation is repeated from step S24.

At the rotational frequency at which the lubricating ability is very low, the lubrication is continued to the uppermost portion as described above since there is the surface tension even when the rotational frequency is lowered after the oil is elevated to the uppermost portion. However, when bubbling or the like occurs in a lower portion of the lubricating oil pump 46 and the refrigerant gas or the like is supplied together with the oil, there may occur a break of lubrication.

In this case, the lubrication to the uppermost portion will be achieved again if there is the lubricating ability. However, because of the absence of such lubricating ability, the oil does not reach the uppermost portion. Therefore, when such a low rotational frequency continues for a specified time, the lubrication is to be assured by increasing again the rotational frequency to the fixed rotational frequency.

As described above, according to the second embodiment of the present invention, the compressor 41 includes a shell, having an internal pressure approximately equal to the pressure of the inhalation gas, and a DC motor 43 for driving the compressing section of the compressor 41. The control device for the compressor 41 includes a reverse induction voltage detector circuit 54 for detecting the rotational position of the rotor 43*a* of the DC motor 43 from the reverse induction voltage generated at the stator winding. An inverter 53 for performing the commutating operation based on the output; of the reverse induction voltage detector circuit 54 during the normal operation is included so as to operate the DC motor 43 at a variable speed. The second embodiment also includes a rotational frequency setting circuit 56 for setting the rotational frequency of the DC motor 43 to a rotational frequency that is lower than the commercial power frequency when the internal temperature of the refrigerator is stabilized. With the above arrangement, by rotating the compressor 41 at a low speed when the internal temperature of the refrigerator is stabilized, a considerable reduction in power consumption can be achieved without being influenced by the leakage heat loss, i.e., by maintaining a high efficiency even at a low rotational frequency.

Furthermore, there may be provided a rotor fixing circuit 61 for issuing a command to turn on a specified phase of the inverter 53 and for outputting a specified voltage when the state of the motor is shifted from the stop state to the operating state by the rotational frequency setting circuit 56. A first timer circuit 60 may also be provided for maintaining the output of the rotor fixing circuit 61 for a specified time interval. With this arrangement, the specified phase can be turned on for a specified time interval in the starting stage to fix the rotor in a specified position, so that the motor can be consistently started from an identical position, thereby enabling the stable starting.

Otherwise, there may be provided a starting commutation pattern storing circuit 62 for storing a specified commutation pattern to accelerate the DC motor 43 in a short time, a starting voltage pattern storing circuit 63 for storing a specified voltage pattern to allow the DC motor 43 to yield a specified torque, and a commutation selector circuit 58 for selecting the output from the starting voltage pattern storing circuit 63 in the starting stage of the DC motor 43 and making the inverter 53 perform its commutating operation. A voltage selector circuit 59 may also be provided for varying the output voltage of the inverter in synchronization with the commutation pattern according to the output of the starting voltage pattern storing circuit 63. Further, a commutation selector circuit 58 may be provided for switching the motor operation to the commutation based on the normal output of the reverse induction voltage detector circuit 54 when the output of the starting voltage pattern storing circuit 63 is completed. With this arrangement, by yielding an output based on the commutation pattern and the voltage pattern preset so that the motor can rotate in a short time while yielding a specified torque to start the motor, the starting in a short time can be achieved to reduce the frequency of the sliding motion in the initial state in which the lubrication is not effected, thus improving the reliability.

Furthermore, there may be provided an increase rate selector circuit 69 for selecting the rate of acceleration by increasing the output voltage of the inverter 53 after the DC motor 43 is started, and a second timer circuit 66 operating for a specified time interval after the starting operation is completed. An increase rate selector circuit 65 may be provided for selecting the first increase rate of the small acceleration when the second timer circuit 66 is operating and for selecting the second increase rate of the great acceleration after the operation of the second timer circuit 66 is completed. With this arrangement, by making the increase rate slower in the acceleration stage after the starting, a stable operation free from step-out can be obtained. Subsequently, by making the increase rate faster, an increased lubricating speed can be achieved to improve the reliability. In the present case, an increase rate adjuster circuit 67 is provided for adjusting the second increase rate so that the time interval for the rotational frequency of the DC motor to increase up to the commercial power frequency falls within a specified time interval at the increase rate selected by the increase rate selector circuit 65. The same frequency of the sliding motion in the state in which no lubrication is effected as in the prior art can be obtained by adjusting the increase rate so that the rotational frequency increases to the rotational frequency equal to the commercial power frequency within the specified time interval, thereby improving reliability.

Furthermore, there may be provided a third timer circuit 68 operating for a specified time interval in the starting stage of the DC motor 43. A rotational frequency selector circuit 69 may also be provided for determining the rotational frequency around the commercial power frequency as a fixed rotational frequency, for ignoring the command rotational frequency of the rotational frequency setting circuit 56 when the third timer circuit 68 is operating, and for setting the fixed rotational frequency 70 as the output target of the inverter. With this arrangement, by operating the motor at the fixed rotational frequency for a specified time interval in the starting stage, the shortage of lubricating oil particularly at a low rotational frequency is eliminated to improve the reliability. In this case, there may be further provided a rotational frequency deciding circuit 71 for deciding that the command rotational frequency of the rotational frequency setting circuit 56 is lower than the specified rotational frequency, and a fourth timer circuit 72 operating when the rotational frequency deciding circuit 71 decides that the rotational frequency is low. With this arrangement, by starting the operation of the third timer circuit 68 when the operation of the fourth timer circuit 72 is completed, the motor is operated at the fixed rotational frequency for a specified time interval when the low rotational frequency continues for a specified time interval. Accordingly, a sufficient amount of lubricating oil is assured even when an unforeseen accident occurs, such as mixture of gas causing an oil shortage at the time of slow rotation, thereby improving the reliability.

Figure 14:
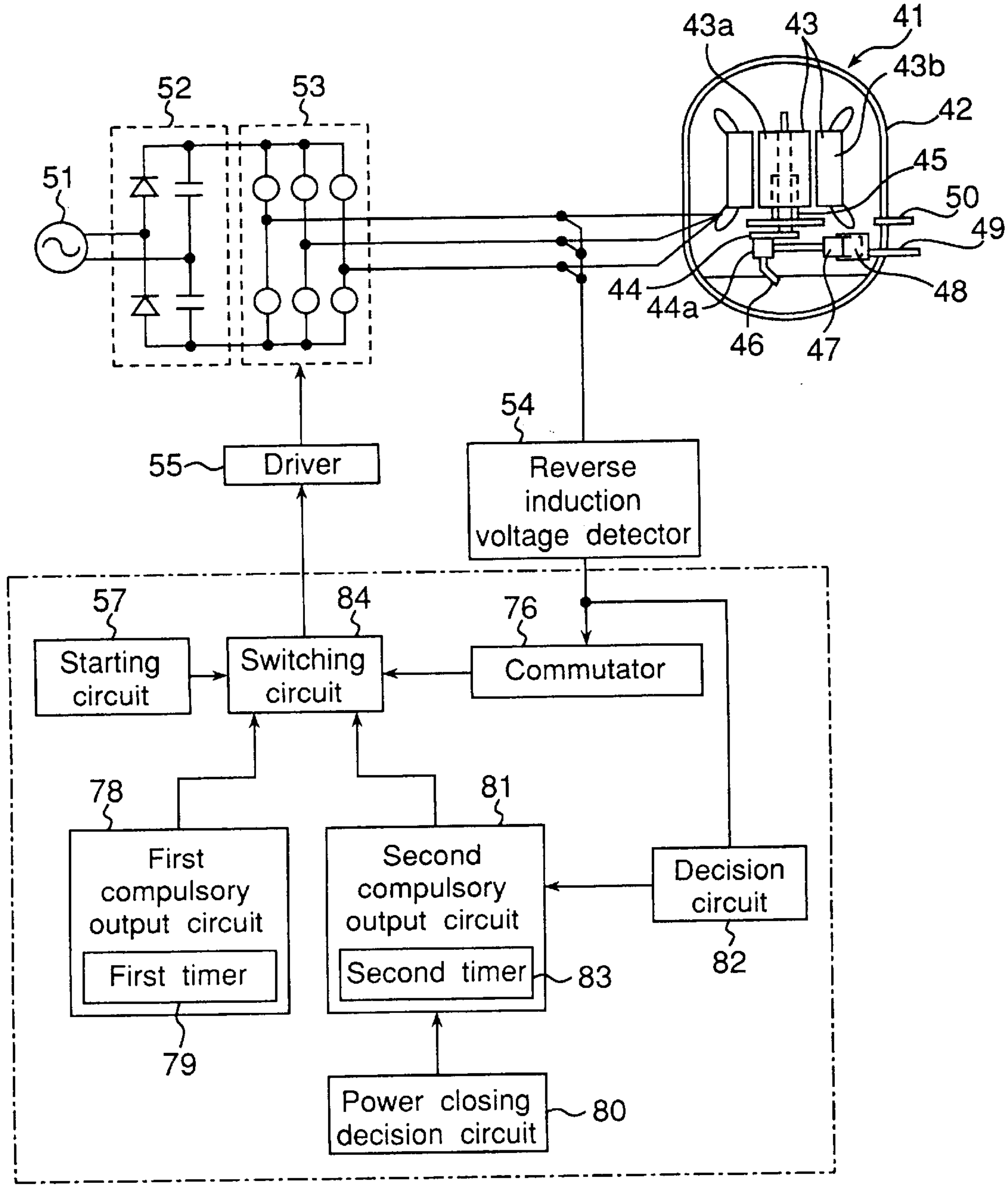
FIG. 14 is a block diagram of a brushless motor starter according to a third embodiment of the present invention.

FIG. 14 is a block diagram of a refrigerator control device according to a third embodiment of the present invention, showing particularly a brushless motor starter. In FIG. 14, no description will be made for components similar to those shown in FIG. 9.

In FIG. 14, a reference numeral 76 denotes a commutator circuit for deciding which one of the elements of the inverter 53 is to be turned on based on the output of the reverse induction voltage detector circuit 54 when the brushless motor 43 is operating normally. A reference numeral 57 denotes a starting circuit which starts the rotation by operating the brushless motor 43 as a synchronous motor from the time when the inverter circuit 53 is stopped to the time when the operation of the reverse induction voltage detector circuit 54 is enabled. A reference numeral 78 denotes a first compulsory output circuit which generates an output of a frequency and a voltage at which the brushless motor 43 does not rotate, only in an operating time t1. A reference numeral 80 denotes a power closing decision circuit which decides the time when the commercial power source 51 is initially closed. A reference numeral 81 denotes a second compulsory output circuit which generates an output of a frequency and a voltage at which the brushless motor 43 does not rotate when the power closing decision circuit 80 decides that the power is closed. A reference numeral 82 denotes a decision circuit which decides the output of the reverse induction voltage detector circuit 54 when the second compulsory output circuit 81 is yielding its output, practically deciding whether or not the reverse induction voltage detector circuit 54 is stabilized. Upon deciding that the circuit is stabilized, the decision circuit 82 stops the output of the second compulsory output circuit 81. A reference numeral 83 denotes a second timer circuit which has two types of timers of t2 and t3 (t2<t3) and operates to continuously output the output of the second compulsory output circuit 81 regardless of the output of the decision circuit 82 when the time is shorter than t2, and to stop the output of the second compulsory output circuit 81 regardless of the output of the decision circuit 82 when the time is not shorter than t3. A reference numeral 84 denotes a switching circuit which selects a predetermined one of the outputs of the commutator circuit 76, starting circuit 57, first compulsory output circuit 78 and second compulsory output circuit 81, and outputs the selected one to the drive circuit 55.

Figure 15:
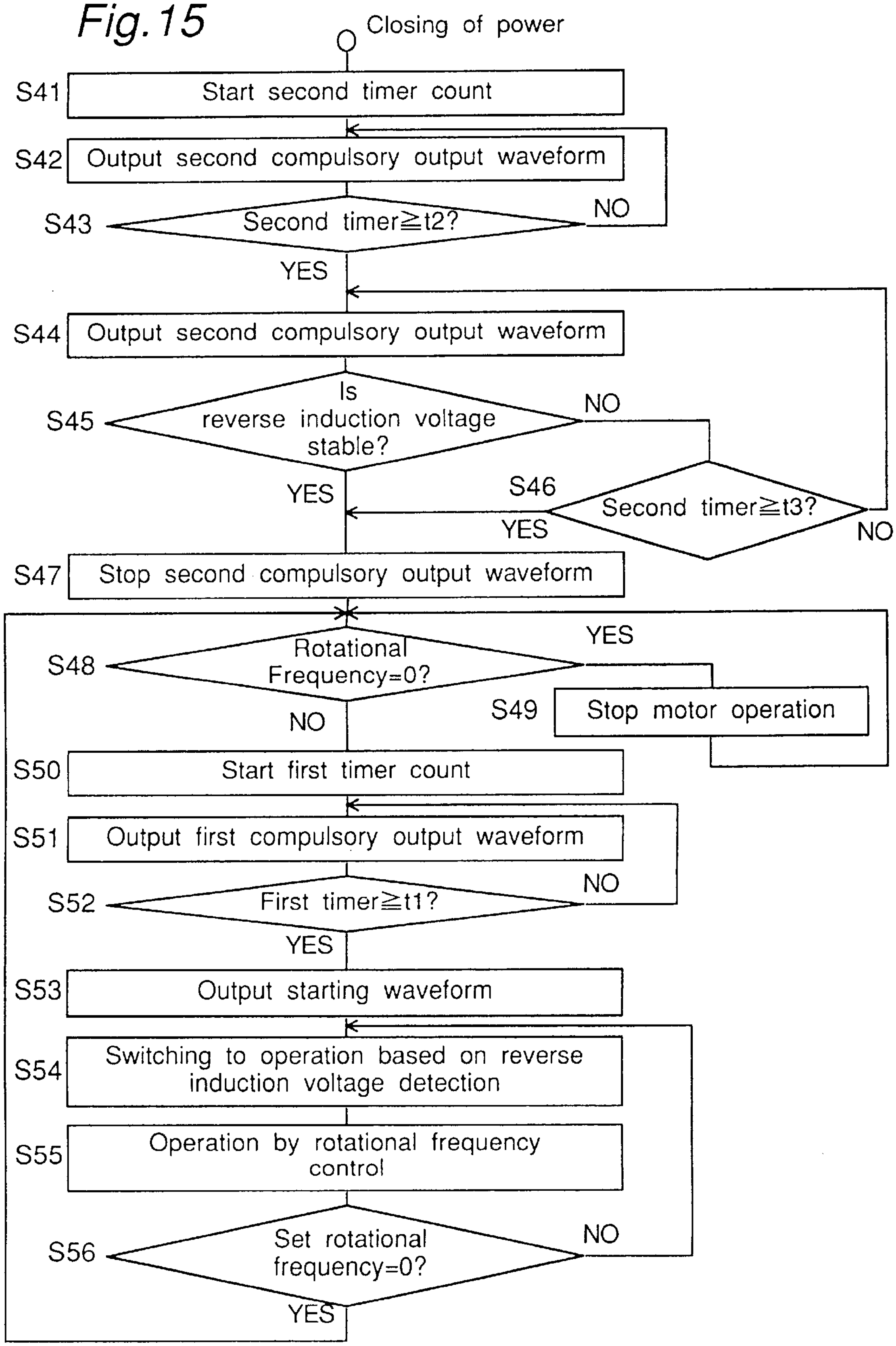
FIG. 15 is a flowchart of the operation of the brushless motor starter shown in FIG. 14.

Operation of the brushless motor starter constructed as above will be described below with reference to FIGS. 14 and 15. FIG. 15 is a flowchart showing the operation of the brushless motor starter of the third embodiment of the present invention.

It is assumed that the commercial power source 51 is now turned off. When the commercial power source 51 is turned on (i.e., when the power is closed), the power closing decision circuit 80 decides that the power is on and starts the counting of the second timer circuit 83 at step S41.

Then, at step S42, the second compulsory output circuit 81 outputs a second compulsory output waveform to operate the inverter 53 via the switching circuit 84 and the drive circuit 55, and applies the output to the brushless motor 43. In this stage, the output level is set to the voltage and frequency at which the motor does not rotate, and therefore the brushless motor 43 does not rotate.

Then, at step S43, it is decided whether or not the count value of the second timer circuit 83 is greater than or equal to t2. When the count value is less than t2, the operation of step S42 is continued. That is, the second compulsory output waveform continues to be outputted. When the count value is greater than or equal to t2, the program flow proceeds to step S44.

At step S44, the second compulsory output circuit 81 continues to output the second compulsory output waveform.

Then, at step S45, the decision circuit 82 decides whether or not the signal from the reverse induction voltage detector circuit 54 is stable. When the signal is stable, the program flow proceeds to step S47. In contrast, when the signal is not stable, the program flow proceeds to step S46.

At step S46, it is decided whether or not the count value of the second timer circuit 83 is greater than or equal to t3. When the count value is less than t3, the operation of step S44 is continued. That is, the second compulsory output waveform continues to be outputted. In contrast, when the count value is greater than or equal to t3, the program flow proceeds to step S47.

At step S47, the output of the second compulsory output circuit 81 is stopped, and the program flow proceeds to step S48. The above processing operation is executed only in the initial time when the power is turned on.

At step S48, it is decided whether or not the currently set rotational frequency is zero. In the present case, the rotational frequency is commanded by detecting a variety of states (e.g., temperature, pressure and so forth), and therefore, no description is made therefor in this specification. When the set rotational frequency is zero, the motor operation is stopped at step S49, and the operation of step S48 is continued. When the set rotational frequency is not zero, the program flow proceeds to step S50.

Next, at step S50, the counting of the first timer circuit is started, and a first compulsory output waveform is outputted from the first compulsory output circuit 78 at step S51 to operate the inverter 53 via the switching circuit 84 and the drive circuit 55, and the output is applied to the brushless motor 43. In this stage, the output level is set to the voltage and frequency at which the motor does not rotate, and therefore, the brushless motor 43 does not rotate.

Next, at step S52, it is decided whether or not the count value of a first timer circuit 79 is greater than or equal to t1. When the count value is less than t1, the operation of step S51 is continued. That is, the first compulsory output waveform continues to be outputted. In contrast, when the count value is greater than or equal to t1, the program flow proceeds to step S53.

Then, at step S53, a starting waveform is outputted from the starting circuit 57 to operate the inverter 53 via the switching circuit 84 and the drive circuit 55, and the output is applied to the brushless motor 43. In the present case, the operation is started using the brushless motor 43 as a synchronous motor. That is, the brushless motor 43 is started according to the method of low-frequency synchronous starting for first putting the motor into a synchronous operation at a low rotational frequency and for thereafter successively accelerating the rotational frequency.

Next, at step S54, the rotation of the brushless motor 43 is continued by switching to the signal of the commutator circuit 76, which signal depends on the output of the reverse induction voltage detector circuit 54. In this time point, the motor has been already driven as a brushless motor, and therefore, the rotational frequency can be adjusted subsequently by adjusting the voltage.

Next, at step S55, a rotational frequency control operation is executed. In this case, the voltage value is adjusted so as to conform to the rotational frequency setting. Next, at step S56, it is decided whether or not the set rotational frequency is zero. When the set rotational frequency is not zero, the operation of step S55 is continued. In contrast, when the set rotational frequency is zero, the program flow proceeds to step S48 to repeat the operation again.

Figure 16:
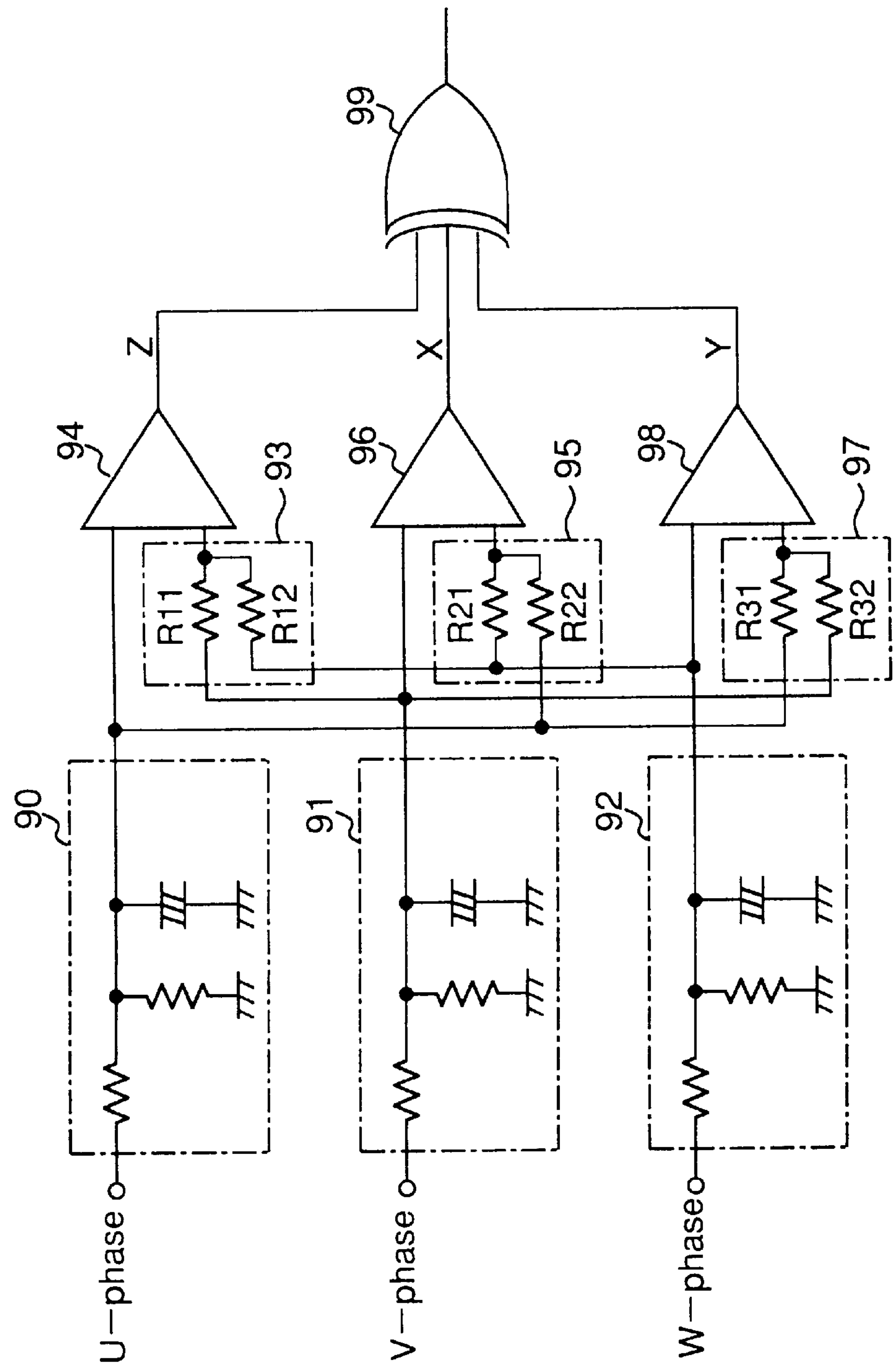
FIG. 16 is a circuit diagram of a reverse induction voltage detecting circuit.

A more detailed description will be made below. FIG. 16 is a circuit diagram of the reverse induction voltage detector circuit 54.

In FIG. 16, a reference numeral 90 denotes a first filter circuit which is basically formed of a primary filter comprised of a resistor and a capacitor, and its input is connected to the U-phase of the brushless motor 43. Reference numerals 91 and 92 denote a second filter circuit and a third filter circuit, respectively and their inputs are connected to the V-phase and W-phase of the brushless motor 43, respectively.

A reference numeral 93 denotes a first combining circuit 93 which combines an output of the second filter circuit 91 with an output of the third filter circuit 92 by means of resistors R11 and R12 (a combining ratio is R11/R12). A reference numeral 94 denotes a first comparator circuit which compares an output of the first filter circuit 90 with an output of the first combining circuit 93, thereby outputting a position detection signal Z.

A reference numeral 95 denotes a second combining circuit which combines the output of the third filter circuit 92 with the output of the first filter circuit 90 by means of resistors R21 and R22 (a combining ratio is R21/R22). A reference numeral 96 denotes a second comparator circuit which compares the output of the second filter circuit 91 with an output of the second combining circuit 95, thereby outputting a position detection signal X.

A reference numeral 97 denotes a third combining circuit which combines the output of the first filter circuit 90 with the output of the second filter circuit 91 by means of resistors R31 and R32 (a combining ratio is R31/R32). A reference numeral 98 denotes a third comparator circuit which compares the output of the third filter circuit 92 with an output of the third combining circuit 97, thereby outputting a position detection signal Y.

Operation of the above-described reverse induction voltage detector circuit 54 will be described below with reference to FIGS. 17A to 17I. FIGS. 17A to 17I show waveforms in various sections when the reverse induction voltage detector circuit 54 is operating.

Figures 17A, 17B, 17C, 17D, 17E, 17F, 17G, 17H, 17I:
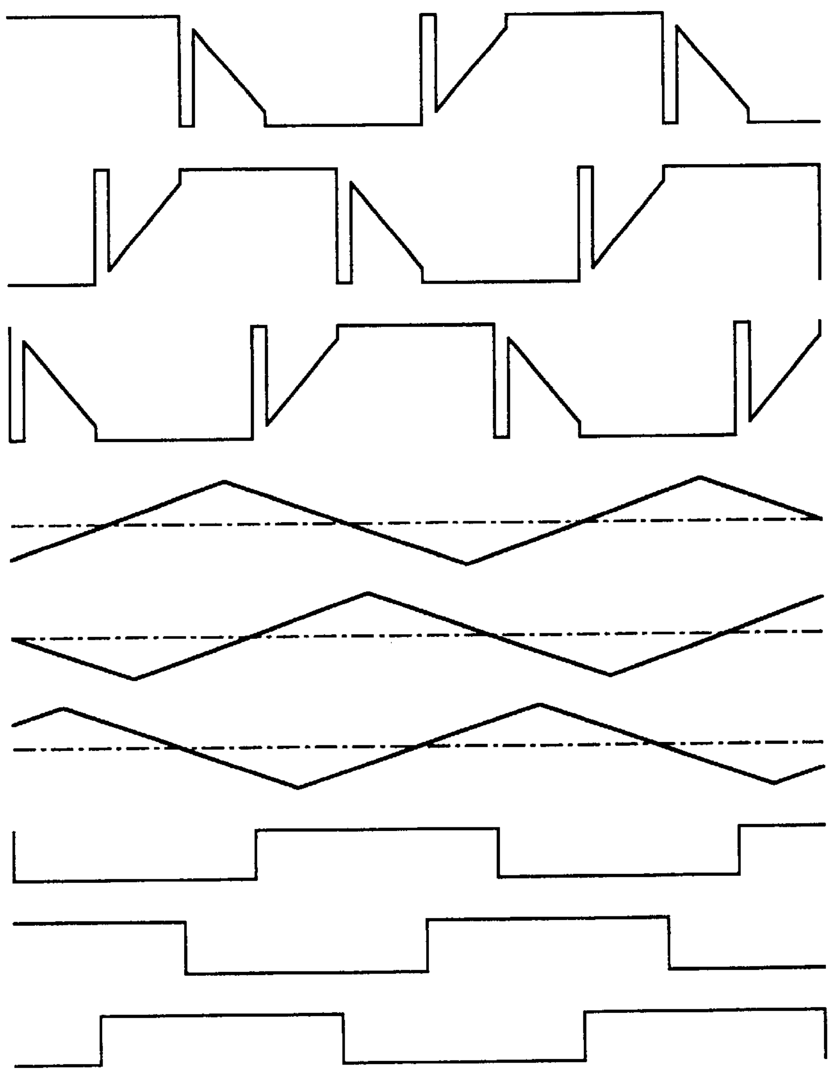
FIGS. 17A, 17B and 17C are waveform charts of U-phase, V-phase and W-phase, respectively, of the reverse induction voltage detecting circuit shown in FIG. 16 in a stable operation stage.
FIGS. 17D, 17E and 17F are waveform charts of outputs of a first filter circuit, a second filter circuit and a third filter circuit, respectively, provided in the reverse induction voltage detecting circuit shown in FIG. 16 in the stable operation stage.
FIGS. 17G, 17H and 17I are waveform charts of outputs of a second comparator circuit, a third comparator circuit and a first comparator circuit, respectively, provided in the reverse induction voltage detecting circuit shown in FIG. 16 in the stable operation stage.

FIGS. 17A, 17B and 17C are voltage waveforms of the U-phase, V-phase and W-phase, which are inputted to the first filter circuit 90, the second filter circuit 91 and the third filter circuit 92, respectively. In the present case, the voltage waveforms are shown schematically for the sake of simplicity of explanation, but the actual waveforms are more complicated waveforms since there is effected a voltage control by PWM (Pulse Width Modulation) or the like.

Further, FIGS. 17D, 17E and 17F are outputs of the first filter circuit 90, the second filter circuit 91 and the third filter circuit 92, respectively, while FIGS. 17G, 17H and 17I are outputs of the second comparator circuit 96, the third comparator circuit 98 and the first comparator circuit 94, respectively.

As is apparent from FIGS. 17A to 17I, it can be found that the position detection signal of the rotor is obtained by extracting only the reverse induction voltage components from the winding voltages of the brushless motor by the filter circuits and comparing them with one another.

In the present case, the operation of the reverse induction voltage detector circuit 54 in its stable operating state has been described. However, a slightly different phenomenon occurs in the starting stage. The phenomenon will be described below.

In the stop state, no voltage is applied to the windings, and the capacitors of the filter circuits are almost electrostatically discharged. Therefore, when the motor starts from the low-frequency synchronous mode in the next starting stage, a complete stability cannot be achieved since the outputs of the filter circuits have transient DC components. This has caused the phenomenon that the output of the reverse induction voltage detector circuit 54 becomes unstable and, hence, the motor has stepped out.

Therefore, in order to remove the transient DC components of the filter circuits before the starting circuit 57 enters into the low-frequency synchronous starting operation, a voltage and a frequency were compulsorily applied for a specified time interval from the first compulsory output circuit 78.

Figures 18A, 18B, 18C, 18D, 18E, 18F:
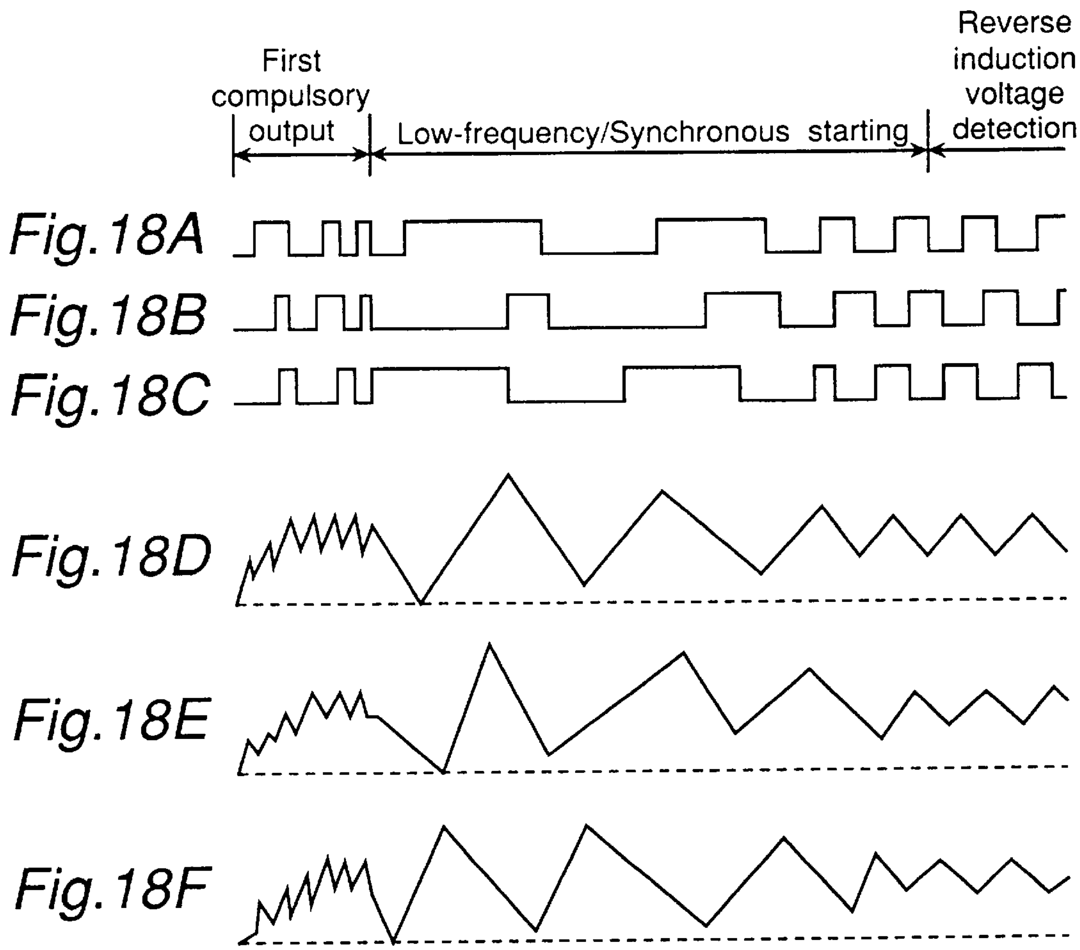
FIGS. 18A, 18B and 18C are waveform charts of position detection signals X, Y and Z, respectively, outputted from the reverse induction voltage detecting circuit in a starting stage.
FIGS. 18D, 18E and 18F are waveform charts of the outputs of the first filter circuit, the second filter circuit and the third filter circuit, respectively, in the starting stage.
Figure 19:
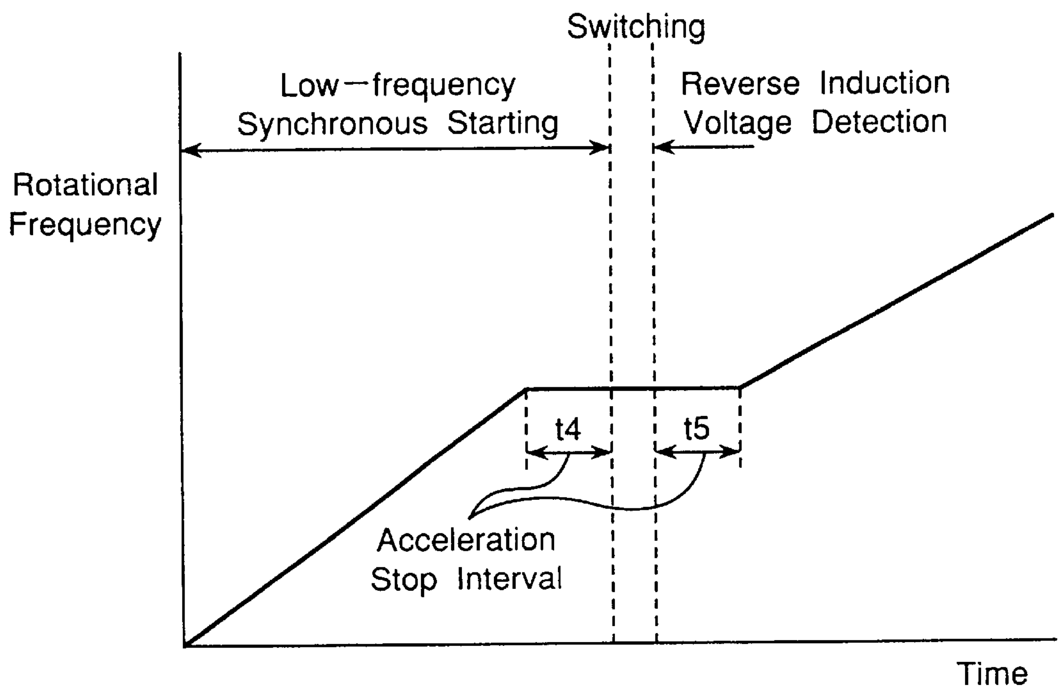
FIG. 19 is a graph for explaining a prior art brushless motor starting method.

The above contents will be described in detail below. FIGS. 18A to 18F show waveforms in the starting stage, where FIGS. 18A, 18B and 18C are respectively the position detection signals X, Y and Z shown in FIG. 16, while FIGS. 18D, 18E and 18F are respectively the outputs of the first filter circuit 90, the second filter circuit 91 and the third filter circuit 92 shown in FIG. 16.

In the present case, by outputting from the first compulsory output circuit 78, the outputs of the filter circuits substantially reach the respective initial charge states at this time. The low-frequency synchronous starting operation is executed from this state, and therefore, the outputs of the filter circuits are stabilized very rapidly. Accordingly, a sufficiently stabilized position detection signal can be obtained by the time when the reverse induction voltage will be detected.

In the present case, it was discovered that applying a waveform having an output frequency of 50 Hz and a chopping duty ratio of 0.7% (pulse turning-on ratio by PWM control) for 155 msec as the first compulsory output waveform was effective through repetitive trial and error. Of course, the frequency is sufficiently high and the voltage (duty ratio) is sufficiently low at this level. Therefore, the brushless motor 43 cannot generate a rotational torque and, hence, it does not rotate. Furthermore, since the voltage is set very low, there is no problem with the input power increasing extremely.

By applying the voltage, the capacitors of the filter circuits can be sufficiently charged before the start. Therefore, the transient DC components in the low-frequency synchronous starting operation can be substantially zeroed while the starting circuit 57 is operating, thereby enabling stable starting.

Furthermore, this processing is also effective even when a long low-frequency synchronous starting time cannot be provided, meaning that this method is an effective method particularly for such a load that a high amount of torque is generated in an early stage after the start- as in the compressor.

The above description was based on the case where the motor is turned on from its stop state. The following will describe the stage where the power is turned on. When the circuit is left intact with the power disconnected for a long time, the charge voltages of the filter circuits are completely discharged. In this state, it is necessary to effect the compulsory output more intensely for a longer time in order to stabilize the filter circuits.

Next, this method will be described. When the power is turned on decision circuit 80 decides that the power is closed, the second compulsory output circuit 81 is caused to output. The output is preferably applied with a voltage higher than that of the first compulsory output circuit 78.

In the present case, we discovered that applying a waveform having an output frequency of 50 Hz and a chopping duty ratio of 10.1% (pulse turning-on ratio by PWM control) for not shorter than 1 sec as the second compulsory output waveform was effective through repetitive trial and error. At this stage, because the voltage, as well as the frequency, is high, the brushless motor 43 does not rotate. Furthermore, though the input power is also high, the above is a processing operation only at the time of turning on the power. Therefore, this does not cause an increase of input for the subsequent turning on and off operations.

Thus, by outputting a waveform having a voltage higher than that of the first compulsory output circuit 78 from the second compulsory output circuit 81 at the time of closing the power, the phenomenon that the position detection signal of the reverse induction voltage detector circuit 54 becomes very unstable can be eliminated, thereby enabling stabilized starting.

Next, completion of an optimum waveform output under such conditions that individual variations were taken into account will be described below with the provision of the stability decision circuit 82.

The conditions of the filter circuits vary for each time the power is turned on, though the procedure is the same. For example, even when identical circuits are used, the time period during which the power is kept on varies from a short one to a long one. Furthermore, the conditions of the filter circuits also vary depending on the variations of parts, motors and so forth between the circuits.

In order to detect the states, the stability decision circuit 82 is provided in this embodiment. Operation of this circuit will be described below.

In regard to the decision of the stability, it is decided that a stability is assured upon detecting six times of occurrence of pulse changes of Ex-OR (Exclusive OR 99) logic outputs with respect to the outputs (position detection signals X, Y and Z) of the reverse induction voltage detector circuit 54 within a period of one cycle (20 msec in this embodiment) of the compulsory output waveform.

In the normal operation, the Ex-OR 99, to which the three position detection signals are inputted, operates as a circuit for deciding whether the three inputs results in an odd number or an even number, and takes advantage of the fact that the pulse changes occur six times when the position detection signals become normal. When the stability is not achieved, the pulse changes occur less than six times.

It is to be noted that although the stability is thus decided by the frequency of the pulse changes in this embodiment, it is apparent that the same effect can be obtained when the stability is decided by detecting, for example, a pulse width.

Furthermore, the second timer circuit 83 is provided which has two types of timers of t2 and t3 (t2<t3, e.g., t2=1 sec and t3=5 sec). When the time is shorter than t2, the output of the second compulsory output circuit 81 continues to be outputted regardless of the output of the decision circuit 82. When the decision circuit 82 decides that the operation is stable after the time becomes greater than or equal to t2, the output of the second compulsory output circuit 81 is stopped. With this arrangement, the possible stop of the output of the second compulsory output circuit 81 due to an erroneous operation of the decision circuit 82 within a short time can be avoided, thereby achieving an appropriate completion.

When the time of the second timer circuit is greater than or equal to t2 and less than t3, the output of the second compulsory output circuit 81 is stopped at the time point when it is decided that the output of the decision circuit 82 is stable. When the time is not less than t3, the output of the second compulsory output circuit 81 is stopped regardless of the output of the decision circuit 82. With this arrangement, even when the decision circuit 82 cannot decide that the operation is stable, the processing operation can be speedily completed. Even in this case, the filter circuits are substantially in their stable states, and therefore, the subsequent start is stabilized, causing no step-out.

As described above, the brushless motor starter according to the present embodiment is provided with the first compulsory output circuit 78 for outputting a waveform of a voltage and a frequency at a level at which the brushless motor 43 does not rotate. The output from the first compulsory output circuit 78 is applied to the brushless motor 43 just before the motor is started from the stop state. This arrangement can reduce the influence of the transient DC components of the filter circuits of the reverse induction voltage detector circuit 54 to stabilize the output of the reverse induction voltage detector circuit 54 immediately after the start, thereby preventing the motor from stepping out even when the load torque increases.

Furthermore, the brushless motor starter according to the present invention is provided with the second compulsory output circuit 81 for outputting a waveform of a voltage and a frequency at a level at which the brushless motor 43 does not rotate, and the power closing decision circuit 80 for deciding that the power is on. When it is decided that the power is on, the inverter 53 is operated by the output of the second compulsory output circuit 81 to apply a voltage to the brushless motor 43. By so doing, a stable start can be achieved even at the turning on of the power in which the position detection tends to be unstable particularly in consequence of a sufficient discharge of the filter circuits.

Also, the decision circuit 82 is provided for deciding whether or not the operation is stabilized based on the signal from the reverse induction voltage detector circuit 54. The decision circuit 82 contributes to speedily complete the processing at the time of turning on the power.

The second timer circuit 83 is further provided which starts its operation from the stage of turning on the power. Even if the processing is not completed by decision in the stage of turning on the power, the operation can be completed speedily and compulsorily, thereby enabling subsequent stable starting.

It is to be noted that although the starter of the present invention has been described as being used with the reciprocating compressor to which a great amount of load is applied particularly in the starting stage, this starter is also effectively used with a rotary compressor or the like to which a great amount of load is applied in the starting stage.

We claim:

1. A refrigerating apparatus comprising:

an inverter circuit having a plurality of semiconductor switches and a plurality of diodes connected with each other in the form of a bridge;

a DC motor operated by said inverter circuit and having a rotor;

a compressor driven by said DC motor;

a condenser connected with said compressor to constitute a refrigerating cycle;

a cooler connected with said compressor;

a position detector operable to detect a position of said rotor of said DC motor;

a commutating device operable to output a commutation pulse to decide an operation of said semiconductor switches of said inverter circuit based on an output of said position detector;

a rotational frequency detector operable to detect a rotational frequency of said compressor based on the output of said position detector;

a lock detector operable to detect a locked state of said compressor based on an output of said rotational frequency detector;

a chopping signal generator operable to generate a chopping signal to effect chopping so as to make variable the rotational frequency of said DC motor;

a combining device operable to combine said commutation pulse with said chopping signal;

a driver operable to turn on and off said semiconductor switches of said inverter circuit based on an output of said combining means;

a starting sequence controller operable to output a predetermined commutation pulse and a predetermined chopping signal to said combining device when no output is obtained from said position detector in a starting stage of said DC motor, said starting sequence controller executing restarting by outputting again the commutation pulse and the chopping signal after a specified time interval when said lock detector detects locking of said compressor;

a plurality of starting sequence pattern storing devices operable to store respective starting sequence patterns of said commutation pulse and said chopping signal outputted from said starting sequence controller, said starting sequence patterns having different output torques;

a torque increasing device operable to select, in the starting stage, a starting sequence pattern of a minimum output torque from among said starting sequence patterns, said torque increasing device operable to select, in a restarting stage, another starting sequence pattern of an output torque greater by one step than said starting sequence pattern of the minimum output torque, and to output the resulting sequence pattern to said starting sequence controller, and an operating mode switching device operable to connect said starting sequence controller to said combining device in the starting stage and to connect said commutating device and said chopping signal generator to said combining device after the motor is started.

2. A refrigerating apparatus comprising:

an inverter circuit having a plurality of semiconductor switches and a plurality of diodes connected with each other in the form of a bridge;

a DC motor operated by said inverter circuit and having a rotor;

a compressor driven by said DC motor;

a condenser connected with said compressor to constitute a refrigerating cycle;

a cooler connected with said compressor;

a position detector operable to detect a position of said rotor of said DC motor;

a commutating device operable to output a commutation pulse to decide an operation of said semiconductor switches of said inverter circuit based on an output of said position detector;

a rotational frequency detector operable to detect a rotational frequency of said compressor based on the output of said position detector;

a lock detector operable to detect a locked state of said compressor based on an output of said rotational frequency detector;

a chopping signal generator operable to generate a chopping signal to effect chopping so as to make variable the rotational frequency of said DC motor;

a combining device operable to combine said commutation pulse with said chopping signal;

a driver operable to turn on and off said semiconductor switches of said inverter circuit based on an output of said combining device;

a starting sequence controller operable to output a predetermined commutation pulse and a predetermined chopping signal to said combining device when no output is obtained from said position detector in a starting stage of said DC motor, said starting sequence controller executing restarting by outputting again the commutation pulse and the chopping signal after a specified time interval when said lock detector detects locking of said compressor;

a plurality of starting sequence pattern storing devices operable to store respective starting sequence patterns of said commutation pulse and said chopping signal outputted from said starting sequence controller, said starting sequence patterns having different output torques;

an ambient temperature detector operable to detect an ambient temperature of said refrigerating cycle:

a torque increasing device operable to compare the ambient temperature detected by said ambient temperature detector with a preset reference ambient temperature, and to select, in the starting stage, one of said starting sequence patterns according to the ambient temperature, said torque increasing device also operable to select, in the restarting stage, another starting sequence pattern of an output torque greater by one step than said one starting sequence pattern, and to output the resulting sequence pattern to said starting sequence controller; and an operating mode switching device operable to connect said starting sequence controller to said combining device in the starting stage and to connect said commutating device and said chopping signal generator to said combining device after the motor is started.

3. A refrigerating apparatus comprising:

an inverter circuit having a plurality of semiconductor switches and a plurality of diodes connected with each other in the form of a bridge;

a DC motor operated by said inverter circuit and having a rotor;

a compressor driven by said DC motor;

a condenser connected with said compressor to constitute a refrigerating cycle;

a cooler connected with said compressor;

a position detector operable to detect a position of said rotor of said DC motor;

a commutating device operable to output a commutation pulse to decide an operation of said semiconductor switches of said inverter circuit based on an output of said position detector;

a rotational frequency detector operable to detect a rotational frequency of said compressor based on the output of said position detector;

a lock detector operable to detect a locked state of said compressor based on an output of said rotational frequency detector;

a chopping signal generator operable to generate a chopping signal to effect chopping so as to make variable the rotational frequency of said DC motor;

a combining device operable to combine said commutation pulse with said chopping signal;

a driver operable to turn on and off said semiconductor switches of said inverter circuit based on an output of said combining device;

a starting sequence controller operable to output a predetermined commutation pulse and a predetermined chopping signal to said combining device when no output is obtained from said position detector in a starting stage of said DC motor, said starting sequence controller executing restarting by outputting again the commutation pulse and the chopping signal after a specified time interval when said lock detector detects locking of said compressor;

a plurality of starting sequence pattern storing devices operable to store respective starting sequence patterns of said commutation pulse and said chopping signal outputted from said starting sequence controller, said starting sequence patterns having different output torques;

a cooler temperature detector operable to detect a cooler temperature;

a torque increasing device operable to compare the cooler temperature detected by said cooler temperature detector with a preset reference cooler temperature, and to select, in the starting stage, one of said starting sequence patterns according to the cooler temperature, said torque increasing device also operable to select, in the restarting stage, another starting sequence pattern of an output torque greater by one step than said one starting sequence pattern, and to output the resulting sequence pattern to said starting sequence controller; and an operating mode switching device operable to connect said starting sequence controller to said combining device in the starting stage and to connect said commutating device and said chopping signal generator to said combining device after the motor is started.

4. A refrigerating apparatus comprising:

an inverter circuit having a plurality of semiconductor switches and a plurality of diodes connected with each other in the form of a bridge;

a DC motor operated by said inverter circuit and having a rotor;

a compressor driven by said DC motor;

a condenser connected with said compressor to constitute a refrigerating cycle;

a cooler connected with said compressor;

a position detector operable to detect a position of said rotor of said DC motor;

a commutating device operable to output a commutation pulse to decide an operation of said semiconductor switches of said inverter circuit based on an output of said position detector;

a rotational frequency detector operable to detect a rotational frequency of said compressor based on the output of said position detector;

a lock detector operable to detect a locked state of said compressor based on an output of said rotational frequency detector;

a chopping signal generator operable to generate a chopping signal to effect chopping so as to make variable the rotational frequency of said DC motor;

a combining device operable to combine said commutation pulse with said chopping signal;

a driver operable to turn on and off said semiconductor switches of said inverter circuit based on an output of said combining device;

a starting sequence controller operable to output a predetermined commutation pulse and a predetermined chopping signal to said combining device when no output is obtained from said position detector in a starting stage of said DC motor, said starting sequence controller executing restarting by outputting again the commutation pulse and the chopping signal after a specified time interval when said lock detector detects locking of said compressor;

a plurality of starting sequence pattern storing devices operable to store respective starting sequence patterns of said commutation pulse and said chopping signal outputted from said starting sequence controller, said starting sequence patterns having different output torques;

an inlet pressure detector operable to detect an inlet pressure of said compressor;

a torque increasing device operable to compare the inlet pressure detected by said inlet pressure detector with a preset reference pressure, and to select, in the starting stage, one of said starting sequence patterns according to the inlet pressure, said torque increasing device also operable to select, in the restarting stage, another starting sequence pattern of an output torque greater by one step than said one starting sequence pattern, and to output the resulting sequence pattern to said starting sequence controller; and an operating mode switching device operable to connect said starting sequence controller to said combining device in the starting stage and to connect said commutating device and said chopping signal generator to said combining device after the motor is started.

* * * * *